United States Patent
Seyama

(10) Patent No.: US 10,177,939 B2
(45) Date of Patent: Jan. 8, 2019

(54) BASE STATION, TERMINAL, AND BASE STATION CONTROL METHOD

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 15/420,825

(22) Filed: Jan. 31, 2017

(65) Prior Publication Data

US 2017/0244580 A1  Aug. 24, 2017

(30) Foreign Application Priority Data

Feb. 24, 2016 (JP) ................. 2016-033540

(51) Int. Cl.
| | | |
|---|---|---|
| H04L 25/02 | (2006.01) | |
| H04B 1/7105 | (2011.01) | |
| H04B 7/0452 | (2017.01) | |
| H04B 15/00 | (2006.01) | |
| H04J 11/00 | (2006.01) | |

(Continued)

(52) U.S. Cl.
CPC ....... *H04L 25/0242* (2013.01); *H04B 1/7105* (2013.01); *H04B 7/0417* (2013.01); *H04B 7/0452* (2013.01); *H04B 15/00* (2013.01); *H04J 11/003* (2013.01); *H04L 25/0248* (2013.01); *H04L 27/2601* (2013.01); *H04W 72/1231* (2013.01); *H04W 88/08* (2013.01); *H04W 88/12* (2013.01)

(58) Field of Classification Search
CPC .. H04B 7/0452; H04B 7/0626; H04B 7/0417; H04B 15/00; H04L 25/0202; H04L 25/0242; H04L 25/0248; H04L 27/2601; H04J 11/003; H04W 72/1231; H04W 88/08; H04W 88/12
See application file for complete search history.

(56) References Cited

U.S. PATENT DOCUMENTS

2013/0101008 A1* 4/2013 Tseng ................... H04B 7/0452
375/227

FOREIGN PATENT DOCUMENTS

JP  2008-236066  10/2008

OTHER PUBLICATIONS

Iwakuni et al. "Inter-User Interference Suppression in Time Varying Channel with Null-Space Expansion for Multiuser Massive MIMO", Dec. 2015, IEEE, pp. 558-562.*

(Continued)

*Primary Examiner* — Sophia Vlahos
(74) *Attorney, Agent, or Firm* — Fujitsu Patent Center

(57) ABSTRACT

A base station includes a channel estimator, a scheduler, and a controller. The channel estimator estimates a channel matrix with respect to each of a plurality of terminals. The scheduler determines a transmission weight corresponding to each of the plurality of terminals on the basis of the channel matrix that is estimated by the channel estimator such that the transmission weight is orthogonal to a current channel matrix and a past channel matrix of a terminal that is a subject of interference. The controller controls, when the transmission weight is determined by the scheduler, the number of samples of the current channel matrix and the past channel matrix to which the transmission weight is to be orthogonal with respect to each of the terminals.

10 Claims, 23 Drawing Sheets

(51) Int. Cl.
*H04L 27/26* (2006.01)
*H04W 72/12* (2009.01)
*H04B 7/0417* (2017.01)
*H04W 88/08* (2009.01)
*H04W 88/12* (2009.01)

(56) References Cited

OTHER PUBLICATIONS

Huang et al. "User Selection for Multi-user MIMO Downlink with Zero-Forcing Beamforming", Sep. 2013, IEEE, pp. 3084-3097.*
Yamaguchi et al., "Channel Prediction Techniques for a Multi-User MIMO System in Time-Varying Environments", Dec. 3014, IEICE transactions on communications, pp. 2747-2755.*
Bui et al. "Performance Evaluation of Multi-User MIMO System with Prediction of Time-Varying Indoor Channels", Jan. 2013, pp. 371-379.*
Tatsuhiko Iwakuni et al., The Institute of Electronics, Information and Communication Engineers, RCS2015-17 (Apr. 2015), "Inter-user Interference Suppression with Null-Space Extension in Multiuser Massive MIMO for Time Varying Channel", pp. 89-94 (6 pages), English Abstract.
Tatsuhiko Iwakuni et al., 2015 IEEE 26th International Symposium on Personal Indoor and Mobile Radio Communications—(PIMRC): Fundamentals and PHY, "Inter-User Interference Suppression in Time Varying Channel with Null-Space Expansion for Multiuser Massive MIMO"(2015), pp. 660-664 (5 pages).

* cited by examiner

| RANGE OF MAXIMUM DOPPLER FREQUENCY | NUMBER OF SAMPLES | CYCLE |
|---|---|---|
| 0 TO 1 Hz | 1 | 5 ms |
| 1 TO 5 Hz | 2 | 5 ms |
| 5 TO 10 Hz | 3 | 10 ms |
| 10 TO 20 Hz | 4 | 10 ms |
| 30 TO 40 Hz | 5 | 10 ms |
| 40 TO 50 Hz | 6 | 20 ms |
| 50 TO 60 Hz | 7 | 20 ms |
| 60 TO Hz | 8 | 20 ms |

BASE STATION, TERMINAL, AND BASE STATION CONTROL METHOD

CROSS-REFERENCE TO RELATED APPLICATION

This application is based upon and claims the benefit of priority of the prior Japanese Patent Application No. 2016-033540, filed on Feb. 24, 2016, the entire contents of which are incorporated herein by reference.

FIELD

The embodiments discussed herein are related to a base station, a terminal, a wireless communication system, and a base station control method.

BACKGROUND

A multi-user multiple-input and multiple-output (MIMO) communication system in which a base station uses multiple antennas at a time to communicate with multiple terminals is known. As for the multi-user MIMO system, a method is known in which the transmitting base station determines transmission weights corresponding respectively to the multiple terminals and weights data signals according to the transmission weights so as not to cause any interference between the users (terminals). The method is referred to as the zero forcing (ZF) method. In the ZF method, the transmission weights are determined by using the channel matrices each between the base station and each of the multiple base stations. In other words, a transmission weight with respect to a terminal is determined such that the transmission weight is orthogonal to a current channel matrix with respect to a terminal that is a subject of interference.

When a terminal move or obstacles around the terminal move, the propagation environment between the base station and the terminals varies and accordingly the channel matrix varies every second. The varying channel matrix (hereinafter, the "varying channel") may disrupt orthogonality between the transmission weight and the channel matrix and accordingly cause interference between the users.

There is a technology referred to as the null-space extension method as a technology for suppressing the effect of varying channels. In the null-space extension method, a transmission weight with respect to a terminal is determined such that the transmission weight is orthogonal to not only a current channel matrix but also a past channel matrix with respect to a terminal that is a subject of interference. This hinders disruption of the orthogonality between the transmission weight and the channel matrix, which makes it possible to suppress interference between users resulting from the varying channels.

Non-Patent Document 1: Iwakuni, Maruta, Ohta, Shirato, Arai and Iizuka, "Jihendou Kankyouka ni okeru Maruchi yuuza Massive MIMO Nurukuukankakuchouhou (Massive MIMO Null-space Extension Method under Time-varying Environment), Shingaku Gihou, RCS2015-17.

Non-Patent Document 2: T. Iwakuni, K. Maruta, A. Ohta, Y. Shirato, T. Arai and M. Iizuka, "Inter-User Interference Suppression in Time Varying Channel with Null-Space Expansion for Multiuser Massive MIMO," in PIMRC2015, 2015.

In the conventional null-space extension method, the number of samples of current channel matrix and past channel matrix to which the transmission weight is orthogonal is fixed at a given value and the throughput may decrease depending on the fixed number of samples.

This aspect will be described with reference to FIG. 1. FIG. 1 is a diagram for explaining a problem of the conventional null-space extension method. In the example illustrated in FIG. 1, a base station has eight transmission antennas. In the example illustrated in FIG. 1, the base station transmits a data signal to a user #1.

As illustrated in FIG. 1, in the ZF method, the maximum number of users for multiplexing is eight. On the other hand, in the null-space extension method, when the number of samples of current channel matrix and past channel matrix with which a transmission weight is orthogonal is 2 (fixed value), the number of users for multiplexing is four (fixed value). Furthermore, in the-null space extension method, when the number of samples of current channel matrix and past channel matrix with which a transmission weight is orthogonal is 4 (fixed value), the number of users for multiplexing decreases to 2 (fixed value).

As described above, in the null-space extension method, the larger the number of samples of current channel matrix and past channel matrix with which a transmission weight is orthogonal is, the more the number of users for multiplexing in MIMO communications decreases and accordingly the throughput decreases. On the other hand, the smaller the number of samples of current channel matrix and past channel matrix with which a transmission weight is orthogonal is, the more the number of users for multiplexing in MIMO communications increases; however, this easily disrupts orthogonality between transmission weight and channel matrix and accordingly cause interference between the users, which may cause interference between users.

SUMMARY

According to an aspect of an embodiment, a base station includes a channel estimator that estimates a channel matrix with respect to each of a plurality of terminals; a scheduler that determines a transmission weight corresponding to each of the plurality of terminals on the basis of the channel matrix that is estimated by the channel estimator such that the transmission weight is orthogonal to a current channel matrix and a past channel matrix of a terminal that is a subject of interference; and a controller that, when the transmission weight is determined by the scheduler, controls a number of samples of the current channel matrix and the past channel matrix to which the transmission weight is to be orthogonal with respect to each of the plurality of terminals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments do not limit the invention. It is possible to combine the embodiments as appropriate as long as no contradiction is caused in the content of processes.

[a] First Embodiment

Overview of Wireless Communication System

Figure 1:
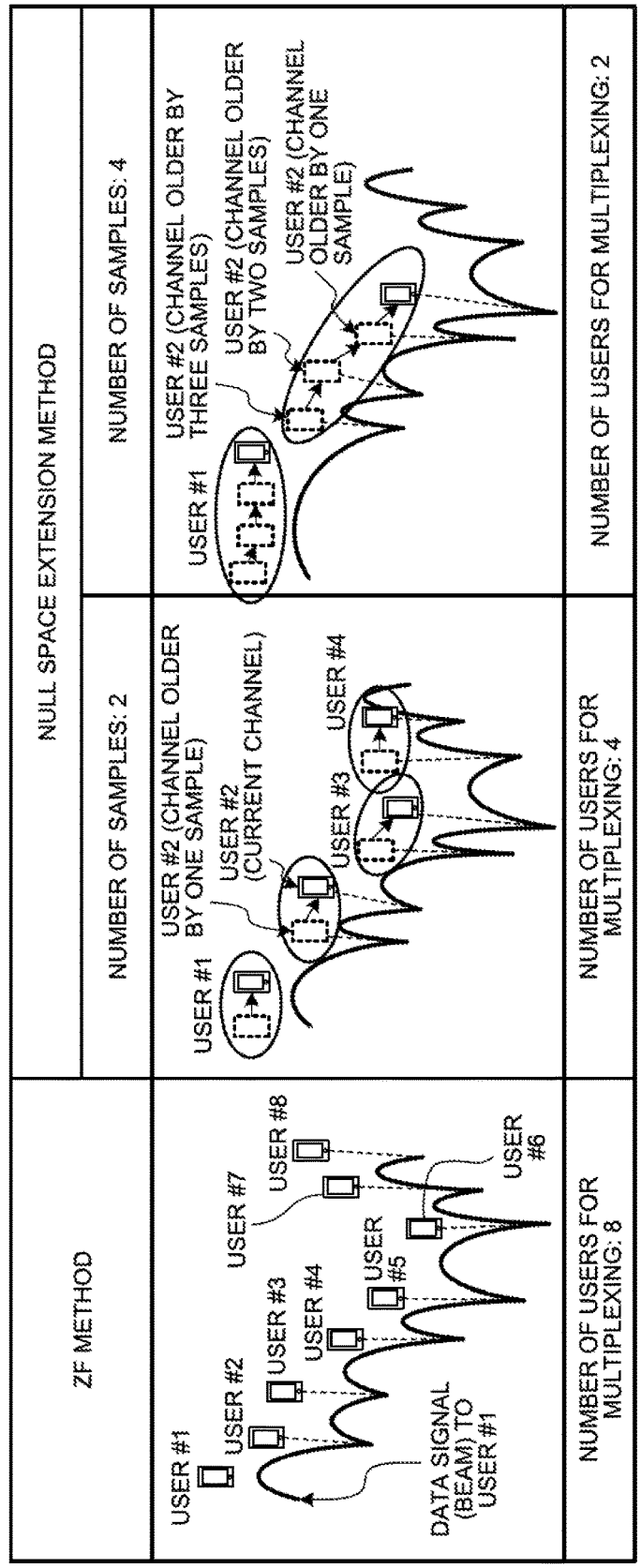
FIG. 1 is a diagram for explaining a problem of the conventional null-space extension system.
Figure 2:
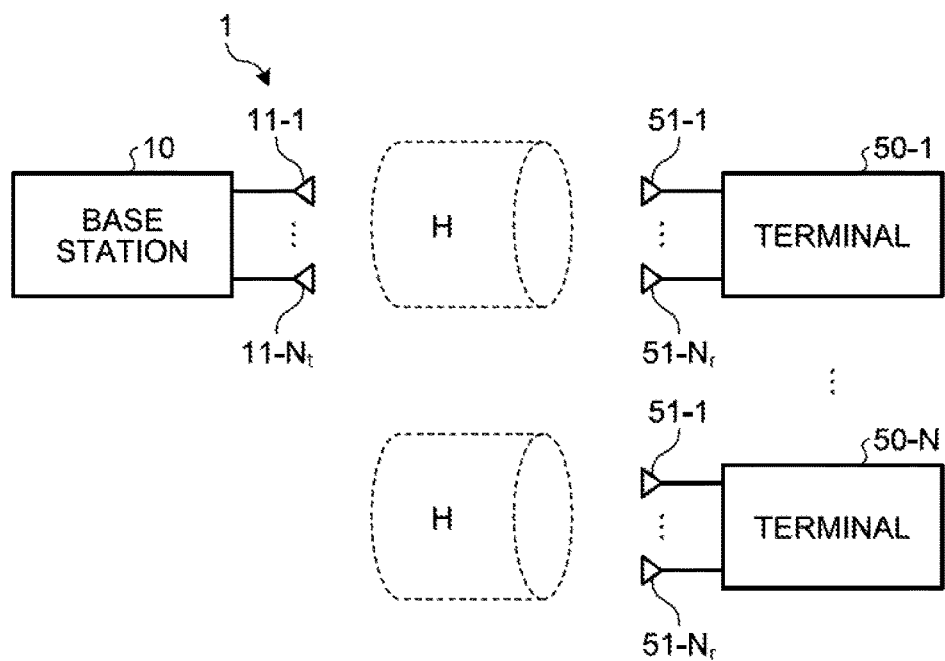
FIG. 2 is a diagram of an exemplary wireless communication system of a first embodiment.

FIG. 2 is a diagram of an exemplary wireless communication system of a first embodiment. According to FIG. 2, a wireless communication system 1 includes a base station 10 and a plurality of terminals 50 (terminals 50-1 to 50-N), where N is a natural number equal to or larger than 2. The terminals 50-1 to 50-N may be generally referred to as terminals 50 below when they are not particularly distinguished from one another.

According to FIG. 2, the base station 10 and the terminal 50 perform wireless communications via a transmission path of a channel matrix H. The base station 10 has $N_t$ transmitting antennas 11-1 to 11-$N_t$. The terminal 50 has $N_r$ receiving antennas 51-1 to 51-$N_r$. $N_t$ is natural number equal to or larger than 2. $N_r$ is natural number equal to or larger than 1.

The transmitting antennas 11-1 to 11-$N_t$ may be generally referred to as transmitting antennas 11 below when they are not particularly distinguished from one another. The receiving antennas 51-1 to 51-$N_r$ may be generally referred to as receiving antennas 51 when they are not particularly distinguished from one another.

The base station 10 estimates a channel matrix H with respect to the each of the terminals 50. The base station 10 then determines a "transmission weight" corresponding to each of the terminals 50 on the basis of the estimated channel matrix H such that the "transmission weight" is orthogonal to a current channel matrix and a past channel matrix with respect to the terminal 50 that is a subject of interference.

When a "transmission weight" is determined, the base station 10 controls, with respect to each of the terminals 50, the "number of samples" of a current channel matrix H and a past channel matrix with which the "transmission weight" is to be orthogonal. In the first embodiment, the base station 10 estimates a maximum doppler frequency with respect to each of the terminals 50 by using the channel matrix H. The maximum doppler frequency represents the amount of variation of the frequency of a reception signal that varies due to the doppler effect according to the move of the terminal 50. The base station 10 then controls the above-described "number of samples" on the basis of the estimated maximum doppler frequency of the terminal 50 that is a subject of interference.

In this manner, the base station 10 controls the "number of samples" of the current channel matrix H and the past channel matrix with which the "transmission weight" is to be orthogonal, which makes it possible to properly change the number of users for multiplexing in MIMO communications that increases or decreases according to the "number of samples". Accordingly, it is possible to suppress interference between users resulting from the varying channel and maintain the throughput.

Exemplary Configuration of Base Station

Figure 3:
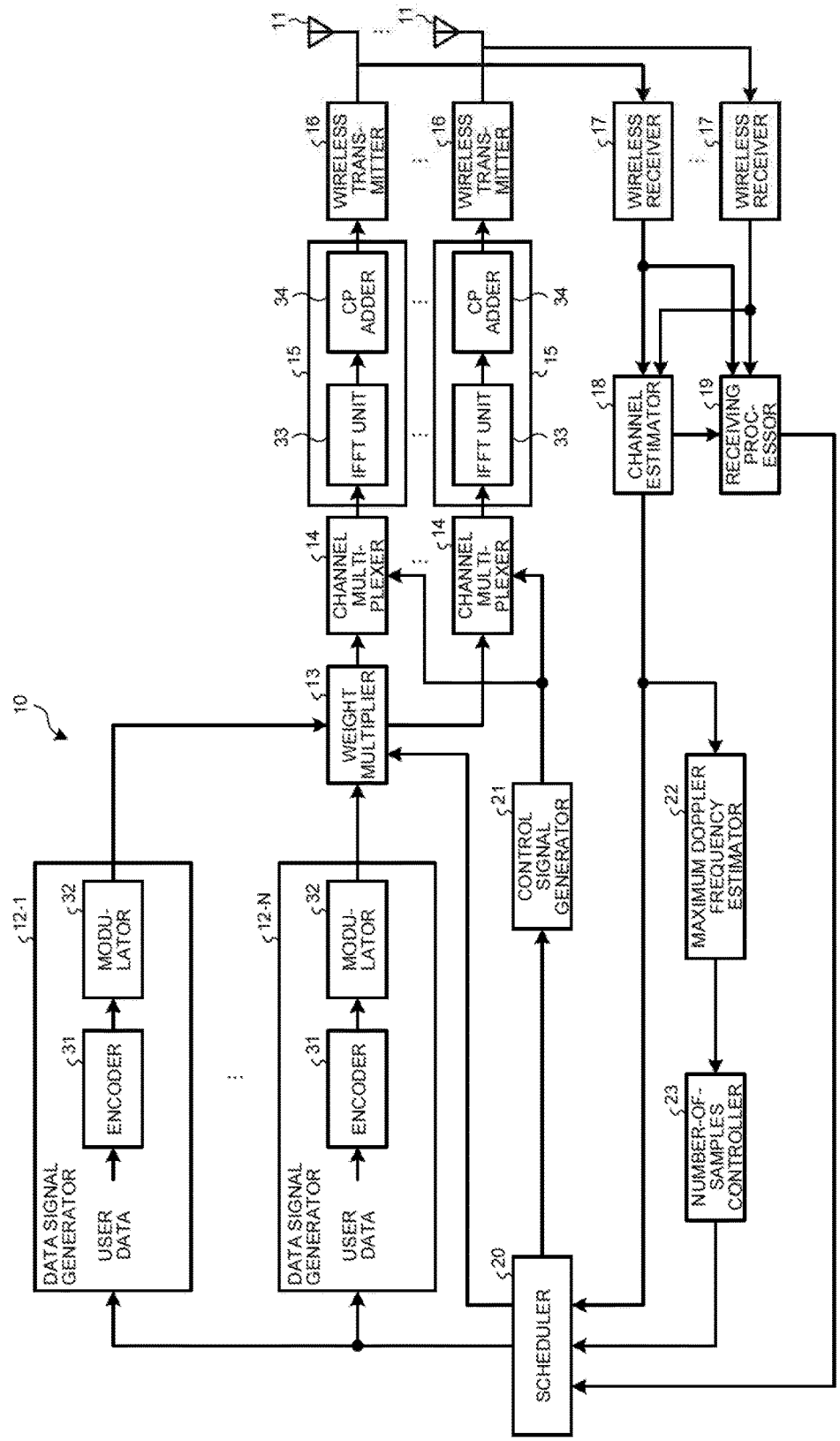
FIG. 3 is a block diagram of an exemplary base station of the first embodiment.

FIG. 3 is a block diagram of an exemplary base station of the first embodiment. According to FIG. 3, the base station 10 includes a plurality of transmitting antennas 11, data signal generators 12-1 to 12N, and a weight multiplier 13. The base station 10 further includes a plurality of channel multiplexers 14, a plurality of orthogonal frequency division multiplexing (OFDM) transmitting processors 15, and a plurality of wireless transmitters 16. The base station 10 further includes a plurality of wireless receivers 17, a channel estimator 18, a receiving processor 19, a scheduler 20, a control signal generator 21, a maximum doppler frequency estimator 22, and a number-of-samples controller 23.

The data signal generators 12-1 to 12N correspond to the terminals 50-1 to 50N, respectively. The data signal generators 12-1 to 12N may be generally referred to as data signal generators 12 when they are not particularly distinguished from one another. Upon receiving "scheduling information" from the scheduler 20, each of the data signal generators 12 generates a data signal on the basis of the "scheduling information". The "scheduling information" contains a modulation level and a coding rate.

Each of the data signal generators 12 includes an encoder 31 and a modulator 32. The encoder 31 performs error correcting coding processing on user data according to the coding rate contained in the scheduling information and outputs the resultant data matrix to the modulator 32. The modulator 32 performs modulation processing on the data matrix received from the encoder 31 and outputs the resultant modulated signal as a data signal to the weight multiplier 13.

The weight multiplier 13 multiplies the data signal that is output from each of the data signal generator 12 with a "transmission weight" that is output from the scheduler 20 to adjust the phase and amplitude of the data signal that is output from each of the data signal generators 12. The weight multiplier 13 changes the phase and amplitude of the data signal that is output from each of the data signal generators 12, which makes it possible to concentrate the radio waves radiated from the transmission antenna 11 on the terminal 50 corresponding to each of the data signal generators 12. Accordingly, interference with radio waves with respect to other terminals 50 is suppressed. The weight multiplier 13 outputs the data signal multiplied with the "transmission weight" to each of the channel multiplexers 14.

The channel multiplexer 14 multiplexes the control signal received from the control signal generator 21 and the data signal received from the weight multiplier 13 and outputs the resultant multiplexed signal to each of the OFDM transmitting processors 15.

Each of the OFDM transmitting processors 15 generates a OFDM signal from the multiplexed signal received from its corresponding channel multiplexer 14. Each of the OFDM transmitting processors 15 includes an inverse fast Fourier transform (IFFT) unit 33 and a cyclic prefix (CP) adder 34. The IFFT unit 33 converts the multiplexed signal received from its corresponding channel multiplexer 14 from a frequency-domain signal to a time-domain signal. The CP adder 34 adds a CP to the time-domain signal obtained by the IFFT unit 33 to obtain a OFDM signal.

Each of the wireless transmitters 16 performs given wireless transmission processing (digital-analog conversion, up-conversion, amplification) on the OFDM signal that is obtained by the OFDM transmitting processor 15 and transmits the resultant wireless signal via its corresponding transmission antenna 11. Each of the transmission antennas 11 is connected to its corresponding wireless transmitter 16 and its corresponding wireless receiver 17 via a duplexer (not illustrated) that is a device shard by antennas. For this reason, each of the transmission antennas 11 functions as a transmitting antenna and a receiving antenna.

Each of the wireless transmitters 17 receives a wireless signal that is transmitted from the terminal 50 via its corresponding one of the transmission antennas 11 functioning as a receiving antenna and the duplexer. Each of the wireless receivers 17 performs given wireless receiving processing (such as down-conversion and analog digital conversion) on the received wireless signal and outputs the resultant signal to the channel estimator 18 and the receiving processor 19.

The channel estimator 18 estimates a channel matrix with respect to each of the terminals 50. For example, the channel estimator 18 estimates a channel matrix with respect to each of terminals 50 by using a reference signal that is transmitted from each of the terminals 50 to the base station 10. The reference signal is, for example, a sounding reference signal (S-RS) or a demodulation reference signal (D-RS).

The receiving processor 19 performs given receiving processing (such as demodulation and decoding) on the signal received from the wireless receiver 17 on the basis of the channel matrix that is estimated by the channel estimator 18 to acquire reception data. The reception data contains Ack/Nack, channel quality indicator (CQI), etc. The receiving processor 19 outputs the acquired reception data to the scheduler 20.

The control signal generator 21 generates a control signal containing "control information" that is received from the scheduler 20 and outputs the generated control signal to each of the channel multiplexers 14. The "control information" contains identifying information on each user (each of the terminals 50) on which scheduling is to be performed, a coding rate and the modulation level that are used for the data signal to each user, etc.

The scheduler 20 determines, at a given time, the terminals 50 that are scheduling targets, "scheduling information" on each of the terminals 50, "control information" on each of the terminals 50, and a "transmission weight" corresponding to each of the terminals 50. The scheduler 20 determines a "transmission weight" corresponding to each of the terminals 50 on the basis of the channel matrix that is estimated by the channel estimator 18 such that the "transmission weight" is orthogonal to a current channel matrix and a past channel matrix with respect to the terminal 50 that is a subject of interference. The "number of samples" of the current channel matrix and the past channel matrix to which the "transmission weight" is to be orthogonal is controlled with a control value that is output from the number-of-samples controller 23. The scheduler 20 then outputs the determined information representing the terminals 50 and the "scheduling information" to each of the data signal generators 12 and outputs the "control information" to the control signal generator 21. Furthermore, the scheduler 20 outputs the determined "transmission weight" to the weight multiplier 13. The details of the processing performed by the scheduler 20 will be described below.

The maximum doppler frequency estimator 22 estimates a maximum doppler frequency with respect to each of the terminals 50 by using the channel matrix that is estimated by the channel estimator 18. For example, the maximum doppler frequency estimator 22 holds the correspondence between the channel matrix and the maximum doppler frequency and estimates a maximum doppler frequency by using the correspondence and the channel matrix that is estimated by the channel estimator 18.

When the scheduler 20 determines a "transmission weight", the number-of-samples controller 23 controls, with respect to each of the terminals 50, the "number of samples" of the current channel matrix and the past channel matrix to which the "transmission weight" is to be orthogonal. The details of the processing performed by the number-of-samples controller 23 will be described in detail below.

The details of the processing performed by the scheduler 20 will be described in detail below. First of all, the scheduler 20 selects the first user (the terminal 50) by using the following Equations (1) and (2).

$$K_{tmp} = K \tag{1}$$

$$u_1 = \operatorname*{argmax}_{k \in K_{tmp}} R_k^{-1} \sum_{v=1}^{N_{rx}} r(\gamma_{k,v}^{(SU)}) \tag{2}$$

In Equations (1) and (2), K denotes a universal set of users (terminals), $R_k$ denotes an average data rate of a user #k, and $r(\gamma)$ denotes an instantaneous data rate in a case where the instantaneous signal to noise ratio (SNR) is $\gamma$.

In Equations (1) and (2), $\gamma_{k,v}^{(SU)}$ denotes an instantaneous SNR of a v-th layer in a case where a data signal is assigned only to the user #k and is expressed by the following Equation (3).

$$\gamma_{k,1}^{(SU)} = \frac{\|H_k(t)\|^2}{\sigma_k^2} \quad (3)$$

In Equation (3), $H_k(t)$ denotes a current channel matrix of the user #k and is estimated by the channel estimator 18. Note that $H_k(t)$ denotes a matrix of $N_{rx} \times N_{tx}$. In Equation (3), $\sigma_k^2$ denotes an interference noise power of the user #k.

When the scheduler 20 chooses the first user, Equation (1) is updated as represented in the following Equation (4).

$$K_{tmp} = K_{tmp} \backslash \{u_1\}$$
$$U = \{u_1\} \quad (4)$$

In Equation (4), X\Y denotes a difference set excluding all elements of a set Y from the elements of a set X.

The scheduler 20 then chooses a m-th (m is a natural number equal to or larger than 2) user (the terminal 50). Specifically, the scheduler 20 uses the following Equation (5) to generate a terminal set L that is a set of terminals satisfying a condition that is previously determined on the basis of the degree of freedom of the transmitting antennas.

$$L = \left\{ u \in K_{tmp} : N_{rx} \cdot \max_{j \leq m-1} \left( \sum_{l=1, l \neq j}^{m-1} N_{ref,k_{u,1}} \right) + N_{ref,u'} \sum_{l=1}^{m-1} N_{ref,k_{u,l}} \leq N_{tx} - N_{rx} \right\} \quad (5)$$

In Equation (5), $N_{ref,k}$ denotes the "number of samples" of a current channel matrix and a past channel matrix with respect to a user that is a subject of interference to which the "transmission weight" corresponding to the user #k is to be orthogonal and is controlled by the number-of-samples controller 23. In Equation (5), the predetermined condition based on the degree of freedom of the transmission antennas is the condition on the right of ":".

The scheduler 20 determines a "transmission weight" corresponding to each of the terminals 50 on the basis of the channel matrix estimated by the channel estimator 18. The scheduler 20 then calculates an instantaneous SNR of a l-th user (the terminal 50) in a user combination S in a case where a multi-user MIMO transmission to the user combination S is performed. The method of determining a "transmission weight" corresponding to each of the terminals 50 and the method of calculating an instantaneous SNR of the l-th user (the terminal 50) in the user combination S will be described below.

The scheduler 20 calculates a proportional fair (PF) metric with respect to each terminal of the terminal set L. The scheduler 20 uses the following Equation (6) to choose, as the m-th user, a user (the terminal 50) with respect to which the PF metric is the largest. In this manner, the scheduler 20 chooses, among the terminals 50, the terminal 50 that satisfies the predetermined condition based on the degree of freedom of the transmitting antennas as a scheduling target and excludes the terminal 50 that does not satisfy the condition from scheduling targets.

$$u_m = \operatorname*{argmax}_{u \in L} \left[ \sum_{i=1}^{m} R_{k_{U \cup \{u\},1}}^{-1} \sum_{v=1}^{N_{rx}} r(\gamma_{l,v|U \cup \{u\}}^{(ZF)}) \right] \quad (6)$$

In Equation (6), $k_{s,l}$ denotes a user number of the l-th user in the user combination S. Furthermore, in Equation (6) $\gamma_{l,v|S}^{(ZF)}$ denotes an instantaneous SNR of the v-th layer of the l-th user (the terminal 50) in the user combination S in the case where multi-user MIMO transmission to the user combination S is performed. In Equation (6), L denotes a terminal set L represented by Equation (5). In Equation (6), X∪Y denotes a sum set of the set X and the set Y.

When the scheduler 20 chooses the m-th user, Equation (4) and the PF metric are updated as represented in the following Equation (7) in order to choose a (m+1)-th user.

$$K_{tmp} = K_{tmp} \backslash u_m$$
$$U = U \cup \{u_m\}$$
$$f_m^{(max)} = \sum_{i=1}^{m} R_{k_{U,1}}^{-1} \sum_{v=1}^{N_{rx}} r(\gamma_{l,v|u}^{(ZF)}) \quad (7)$$

The scheduler 20 repeatedly chooses a m-th user until m reaches a preset maximum-multiplexing-number M that is the maximum value of the number of users for multiplexing.

When m reaches the maximum-multiplexing-number M, the scheduler 20 determines a number of users for multiplexing $m_{max}$ for which the PF metric is the largest by using the following Equation (8).

$$m_{max} = \operatorname*{argmax}_{m} f_m^{(max)} \quad (8)$$

The scheduler 20 then determines a coding rate and a modulation level that are used for the data signal to each of the terminals 50 that is chosen as a scheduling target and generates the "scheduling information" and the "control information" described above. The scheduler 20 outputs the generated "scheduling information" and "control information" to the data signal generators 12 and the control signal generator 21, respectively. The scheduler 20 outputs the determined "transmission weight" to the weight multiplier 13.

The method of determining a "transmission weight" corresponding to each of the terminals 50 and the method of calculating an instantaneous SNR of a l-th user (the terminal 50) in the user combination S will be described. First of all, the scheduler 20 combines channel matrices estimated by the channel estimator 18 to create a combined channel matrix represented by Equation (9).

$$\tilde{F}_S = [H_{k_{S,1}}^T(t) H_{k_{S,2}}^T(t) \ldots H_{k_{S,|S|}}^T(t)]^T \quad (9)$$

In Equation (9), |S| denotes the number of users in the user combination S. In Equation (9), $A^T$ denotes a transpose of the matrix A.

The scheduler 20 combines $N_{ref,k_{S,l'}} - 1$ ($1 \leq l' \leq |S|$) past channel matrices of a l'-th user other than the l-th user in the user combination S to the combined channel matrix represented by Equation (9) to create the two matrices represented by the following Equations (10).

$$\tilde{F}_{l|S} = [\tilde{H}_S^T G_1^T \ldots G_{l-1}^T G_{l+1}^T \ldots G_{|S|}^T]^T$$

$$G_{l'} = [H_{k_{S,l'}}^T(t-T_{ch}) H_{k_{S,l'}}^T(t-2T_{ch}) \ldots H_{k_{S,l'}}^T(t-(N_{ref,k_{S,l'}}-1)T_{ch})]^T \quad (10)$$

In Equations (10), $T_{ch}$ denotes a cycle at which the channel estimator 18 estimates a channel matrix.

The scheduler 20 may create the two matrices represented by the following Equations (11) instead of the two matrices represented by Equations (10).

$$\tilde{F}_{l|S} = [\tilde{H}_S^T G_1'^T \ldots G_{l-1}'^T G_{l+1}'^T \ldots G_{|S|}'^T]^T$$

$$G_{l'}' = [H_{k_{S,l'}}'^T(t-T_{ch}) H_{k_{S,l'}}'^T(t-2T_{ch}) \ldots H_{k_{S,l'}}'^T(t-(N_{ref,k_{S,l'}}-1)T_{ch})]^T \quad (11)$$

In Equation (11), the component of a j-th column of $H'^T_{k_{S,l'}}(t-nT_{ch})$ is acquired by using the following Equations (12).

$$\left(H_{k_{s,l'}}^{'T}(t-nT_{ch})\right)_j = \quad (12)$$

$$\left(H_{k_{s,l'}}^{T}(t-nT_{ch})\right)_j - \sum_{n'=0}^{n-1}\left\{q_{j,n'}^{'H}\left(H_{k_{s,l'}}^{T}(t-nT_{ch})\right)_j\right\}q_{j,n'}$$

$$j = 1, 2, \ldots, N_{rx}$$

$$n = 1, 2, \ldots, N_{ref,k_{s,l'}} - 1$$

$$q_{j,0}^H = \left\|\left(H_{k_{s,l'}}^{'T}(t)\right)_j\right\|^{-1}\left(H_{k_{s,l'}}^{'T}(t)\right)_j$$

$$q_{j,n}^H = \|q_{j,n}'^H\|^{-1} q_{j,n}'^H$$

$$q_{j,n}'^H = \left(H_{k_{s,l'}}^{T}(t-nT_{ch})\right)_j - \sum_{n'=0}^{n-1}\left\{q_{j,n'}^{'H}\left(H_{k_{s,l'}}^{T}(t-nT_{ch})\right)_j\right\}q_{j,n'}$$

$$n = 1, 2, \ldots, N_{ref,k_{s,l'}} - 2$$

The scheduler 20 then determines a "transmission weight" corresponding to each user in the user combination S (each of the terminals 50) such that the "transmission weight" is orthogonal to a current channel matrix and a past channel matrix. Specifically, when the number of receiving antennas of a user (the terminal 50) is one, the scheduler 20 uses the ZF method to determine a transmission weight of the l-th user in the user combination S as represented in the following Equation (13).

$$w_l = \frac{\sqrt{p_l}\,(W_l)_l}{\|(W_l)_l\|} \quad (13)$$

A matrix $W_l$ in Equation (13) is expressed by the following Equation (14).

$$W_l = \tilde{F}_{l|S}^H(\tilde{F}_{l|S}\tilde{F}_{l|S}^H)^{-1} \quad (14)$$

In Equation (14), $A^H$ denotes a complex conjugate transpose matrix of the matrix A.

In Equation (13), $(W_l)_l$ denotes a column vector of a l-th column of the matrix $W_l$. In Equation (13), $p_l$ denotes a transmission power of the l-th user and, when power is distributed equally to each user, the following Equation (15) holds.

$$p_1 = p_2 = \ldots = p_{|S|} = P/|S| \quad (15)$$

In Equation (15), P denotes a total transmission power.

On the other hand, when the number of receiving antennas of the user (the terminal 50) is two or more, the scheduler 20 determines a transmission weight of the l-th user in the user combination S by using block diagonalization and an eigen mode as represented by the following Equation (16).

$$W_l^{(BD)} = \tilde{V}_l^{(BD)} \cdot V_l^{(EM)} \cdot \text{diag}\left\{\frac{\sqrt{p_{l,1}}}{\|(\tilde{V}_l^{(BD)} \cdot V_l^{(EM)})_1\|}, \frac{\sqrt{p_{l,2}}}{\|(\tilde{V}_l^{(BD)} \cdot V_l^{(EM)})_2\|} \ldots \frac{\sqrt{p_{l,N_{rx}}}}{\|(\tilde{V}_l^{(BD)} \cdot V_l^{(EM)})_{N_{rx}}\|}\right\} \quad (16)$$

In Equation (16), $\tilde{V}_l^{(BD)}$ is a matrix obtained by choosing arbitrary $N_{rx}$ columns of a matrix $\tilde{V}_l^{(O)}$ of an orthogonal complement $N_{tx} \times \{N_{tx} - (|S|-1)N_{rx}\}$ obtained by performing singular value decomposition on the matrix $\tilde{F}_{l|S}$ of Equitation (10). The matrix $\tilde{F}_{l|S}$ of Equation (10) is expressed by using singular value decomposition as represented by the following Equation (17).

$$\tilde{F}_{l|S} = US[\tilde{V}_l^{(1)}\tilde{V}_l^{(0)}]^H \quad (17)$$

In Equation (17), a matrix U is a unitary matrix of $(|S|-1)N_{rx} \times (|S|-1)N_{rx}$. In Equation (17), the matrix S is a matrix where the singular value of the matrix of $(|S|-1)N_{rx} \times N_{tx}$ is a diagonal element.

In Equation (16), $\tilde{V}_l^{(BD)}$ may be a matrix calculated by choosing $N_{rx}$ column vectors the closest to the eigen beam of the channel matrix $H_l$ among the column vectors of a matrix $\tilde{V}_l^{(O)}$. In other words, assume that the channel matrix $H_l$ is expressed by Equation (18) by using singular value decomposition. Here, as represented by the following Equation (19), a column vector where the inner product between the column vector and the eigen beam of the channel matrix $H_l$ is the largest is chosen.

$$H_l = XYZ^H \quad (18)$$

$$(\tilde{V}_l^{(BD)})_v = \underset{v'=1,2,\ldots,N_{rx}-(|S|-1)N_{rx},(\tilde{V}_l^{(0)})_{v'} \neq (\tilde{V}_l^{(BD)})_{v''},v''=1,2,\ldots,v-1}{\arg\max} \left|(Z)_v^H((\tilde{V}_l^{(0)})_{v'})\right|^2, \quad (19)$$

$$v = 1, 2, \ldots, N_{rx}$$

In Equation (16), $V_l^{(EM)}$ denotes an eigen mode weight matrix of an equivalent channel matrix $H_l\tilde{V}_l^{(BD)}$ after block diagonalization. The equivalent channel matrix after the block diagonalization is expressed by the following Equation (20) by using singular value decomposition.

$$H_l\tilde{V}_l^{(BD)} = U_l\Lambda_l(V_l^{(EM)})^H \quad (20)$$

In Equation (16), $p_{l,v}$ denotes a power assigned to a v-th layer of the l-th user in the user combination S. In Equation (16), $\text{diag}(a_1, a_2, \ldots, a_N)$ denotes a diagonal matrix where $a_1, a_2, \ldots, a_N$ are diagonal elements.

The scheduler then calculates an instantaneous SNR of the l-th user in the user combination S. Specifically, when the number of receiving antennas of the user (the terminal 50) is one, the scheduler 20 calculates an instantaneous SNR of the l-th user in the user combination S by using the following Equation (21). On the other hand, when the number of receiving antennas of the user (the terminal 50) is two or more, the scheduler 20 calculates an instantaneous SNR of the v-th layer of the l-th user in the user combination S by using the following Equation (22).

$$\gamma_{l,1|S} = \frac{p_l}{\sigma_{k_{s,l}}^2 \|w_l\|^2} \quad (21)$$

$$\gamma_{l,v|S} = \frac{p_{l,v}((\Lambda_l)_{v,v})^2}{\sigma_{k_{s,l}}^2 \|(\tilde{V}_l^{(BD)} \cdot V_l^{(EM)})_v\|^2} \quad (22)$$

The above descriptions represent the example where, when the number of receiving antennas of a user (the terminal 50) is two or more, a transmission weight is determined by using block diagonalization and an eigen mode; however, the technology disclosed herein is not limited to this. For example, a transmission weight may be determined by using the ZF method or by using only block diagonalization.

The process performed by the number-of-samples controller 23 will be described in detail below. The number-of-samples controller 23 controls the above-described "number of samples" on the basis of the maximum Doppler frequency with respect to the terminal 50 that is a subject of interference, which is a doppler frequency estimated by the maximum Doppler frequency estimator 22. Specifically, the number-of-samples controller 23 holds a number-of-samples table in which the "number of samples" is associated with each range of maximum doppler frequency. The number-of-samples controller 23 refers to the number-of-samples table and determines the "number of samples" corresponding to the maximum doppler frequency with respect to the terminal of interference, which is the maximum doppler frequency estimated by the maximum doppler frequency estimator 22. The number-of-samples controller 23 outputs the determined "number of samples" as a control value to the scheduler 20.

Figure 4:
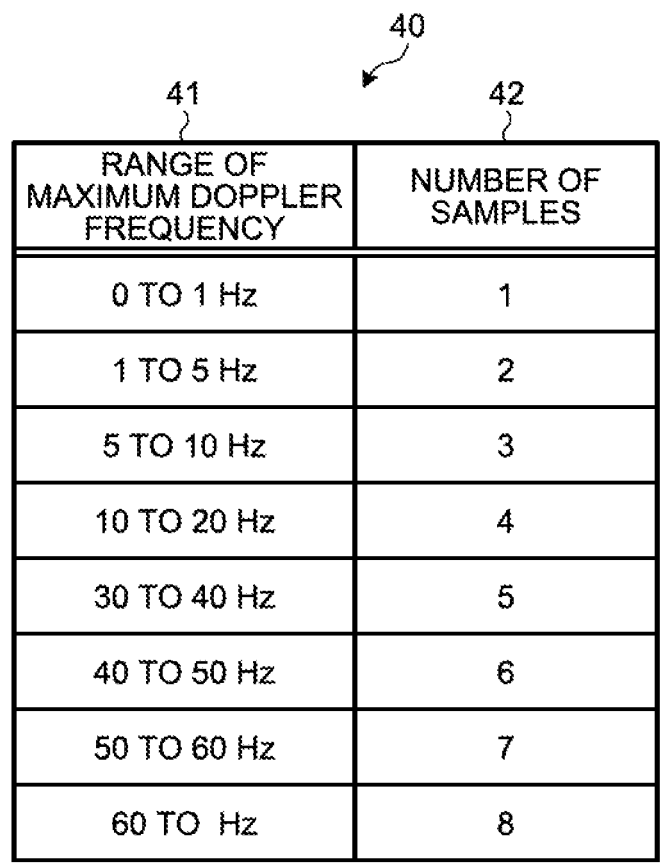
FIG. 4 is a diagram of an exemplary number-of-samples table of the first embodiment.

FIG. 4 is a diagram of an exemplary number-of-samples table of the first embodiment. A number-of-samples table 40 represented in FIG. 4 holds a number-of-samples 42 in association with a maximum doppler frequency range 41. In the example represented in FIG. 4, the larger the absolute value of each maximum doppler frequency that belongs to the maximum doppler frequency range 41 is, the larger the number-of-samples 42 is.

A procedure of determining the "number of samples" will be described by using a specific example. For example, assume that the maximum doppler frequency with respect to the terminal 50 that is a subject of interference, which is the maximum doppler frequency estimated by the maximum doppler frequency estimator 22, is "3 Hz". In this case, the number-of-samples controller 23 refers to the number-of-samples table 40 exemplified in FIG. 4 and, because the maximum doppler frequency "3 Hz" belongs to the range "1 to 5 Hz", the number-of-samples controller 23 determines that the "number of samples" is "2".

Exemplary Configuration of Terminal

Figure 5:
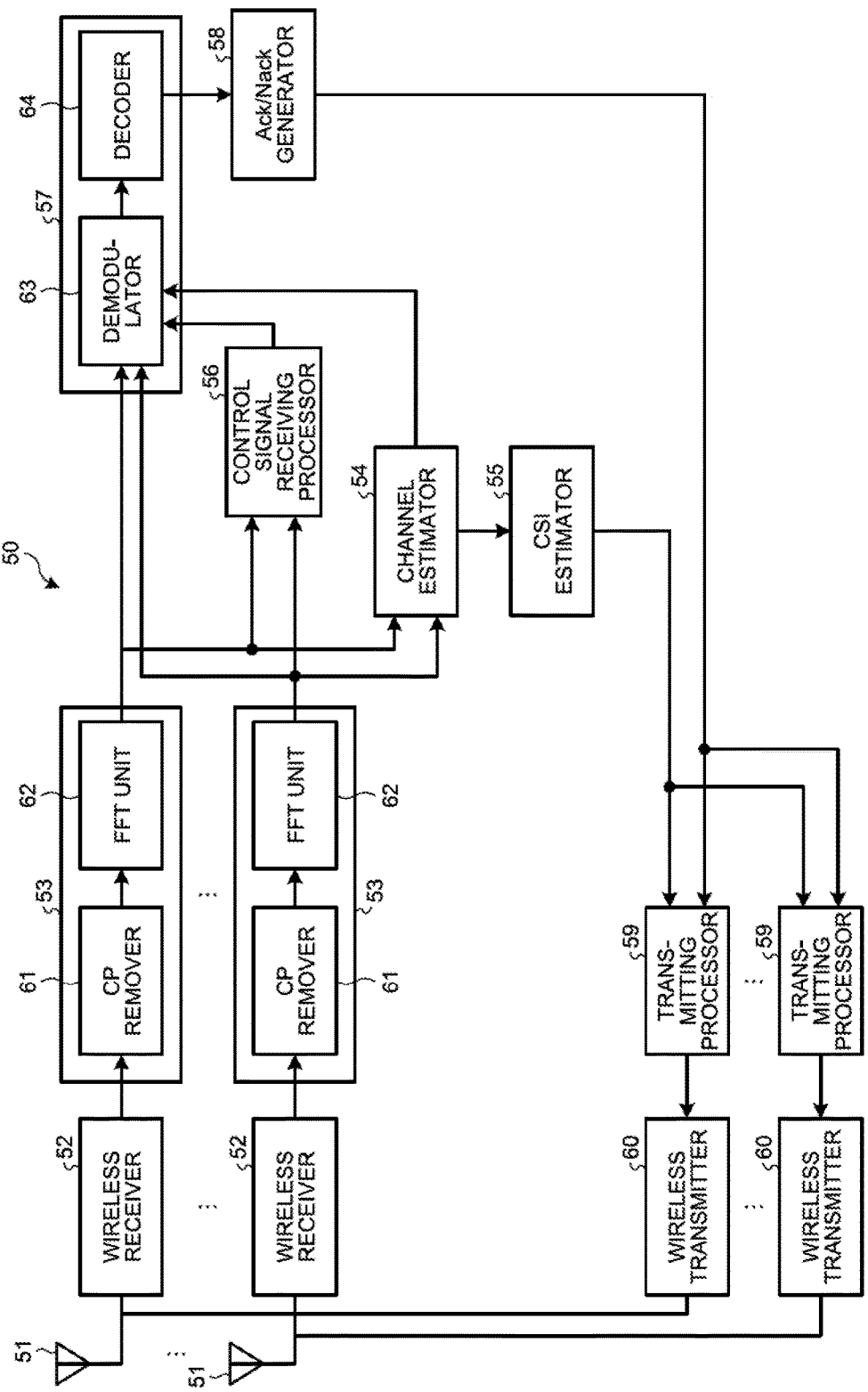
FIG. 5 is a block diagram of an exemplary terminal of the first embodiment.

FIG. 5 is a block diagram of an exemplary terminal of the first embodiment. According to FIG. 5, the terminal 50 includes a plurality of receiving antennas 51, a plurality of wireless receivers 52, a plurality of OFDM receiving processor 53, a channel estimator 54, a channel state information (CSI) estimator 55, and a control signal receiving processor 56. The terminal 50 further includes a receiving processor 57, an Ack/Nack generator 58, a plurality of transmitting processors 59, and a plurality of wireless transmitters 60.

Each of the wireless receivers 52 performs given wireless receiving processing (such as down-conversion and analog-digital conversion) on a wireless signal that is received via each of the receiving antennas 51 and outputs the resultant OFDM signal to its corresponding one of the OFDM receiving processors 53.

Each of the OFDM receiving processors 53 forms a reception signal from the OFDM signal received from its corresponding one of the wireless receivers 52. Each of the OFDM receiving processors 53 includes a CP remover 61 and a FFT unit 62. The CP remover 61 removes a CP from the OFDM signal received from the wireless receivers 52 and outputs the OFDM signal after removal of the CP to the FFT unit 62. The FFT unit 62 converts the OFDM signal after removal of the CP from a time-domain signal to a frequency-domain signal and outputs the resultant frequency-domain signal as a reception signal to the channel estimator 54, the control signal receiving processor 56, and the receiving processor 57.

The channel estimator 54 estimates a channel matrix with respect to its corresponding terminal 50 on the basis of a pilot signal of a pilot channel that is contained in the reception signal obtained by each of the OFDM receiving processors 53.

The CSI estimator 55 estimates a CSI on the basis of the estimated channel matrix that is estimated by the channel estimator 54 and outputs the estimated CSI to each of the transmitting processors 59.

The control signal receiving processor 56 demodulates the control signal of the control channel contained in the reception signal obtained by each of the OFDM receiving processors 53 and outputs the control information contained in the result of demodulation to the receiving processor 57. As described above, the control information contains identifying information on each user (each terminal 50) that is a scheduling target and a coding rate and a modulation level that are used for the data signal to each user.

The receiving processor 57 includes a demodulator 63 and a decoder 64. The demodulator 63 demodulates the data signal of the data channel that is contained in the reception signal, which is obtained by each of the OFDM receiving processors 53, on the basis of the channel matrix estimated by the channel estimator 54. The decoder 64 performs error correction decoding on the data signal demodulated by the demodulator 63.

When the decoder 64 succeeds in error correction decoding on the data signal to its corresponding terminal, the Ack/hack generator 58 generates an Ack signal and outputs the Ack signal to each of the transmitting processors 59. When the decoder 64 fails in error correction decoding, the Ack/Nack generator 58 generates a Nack signal and outputs the Nack signal to each of the transmitting processors 59.

Each of the transmitting processors 59 performs given transmitting processing (coding and modulation) on the input signal and the reference signal (such as an S-RS and a D-RS) and outputs the resultant modulation signal to its corresponding wireless transmitter 60.

Each of the wireless transmitters 60 performs given wireless transmitting processing (such as digital-analog conversion and up-conversion) on the modulation signal that is received from its corresponding transmitting processor 59 and transmits the resultant wireless signal via its corresponding receiving antenna 51. Each of the receiving antennas 51 is connected to its corresponding one of the wireless receivers 52 and its corresponding one of the wireless transmitters 60 via the duplexer (not illustarated) serving as a device shard by the antennas. For this reason, each of the receiving antennas 51 functions as both a transmitting antenna and a receiving antenna.

Exemplary Operations of Wireless Communication System

Exemplary processing operations performed by the wireless communication system 1 having the above-described configuration will be described. Particularly, a scheduling processing method and a method of controlling the "number of samples" performed by the base station 10 will be described here.

Figure 6:
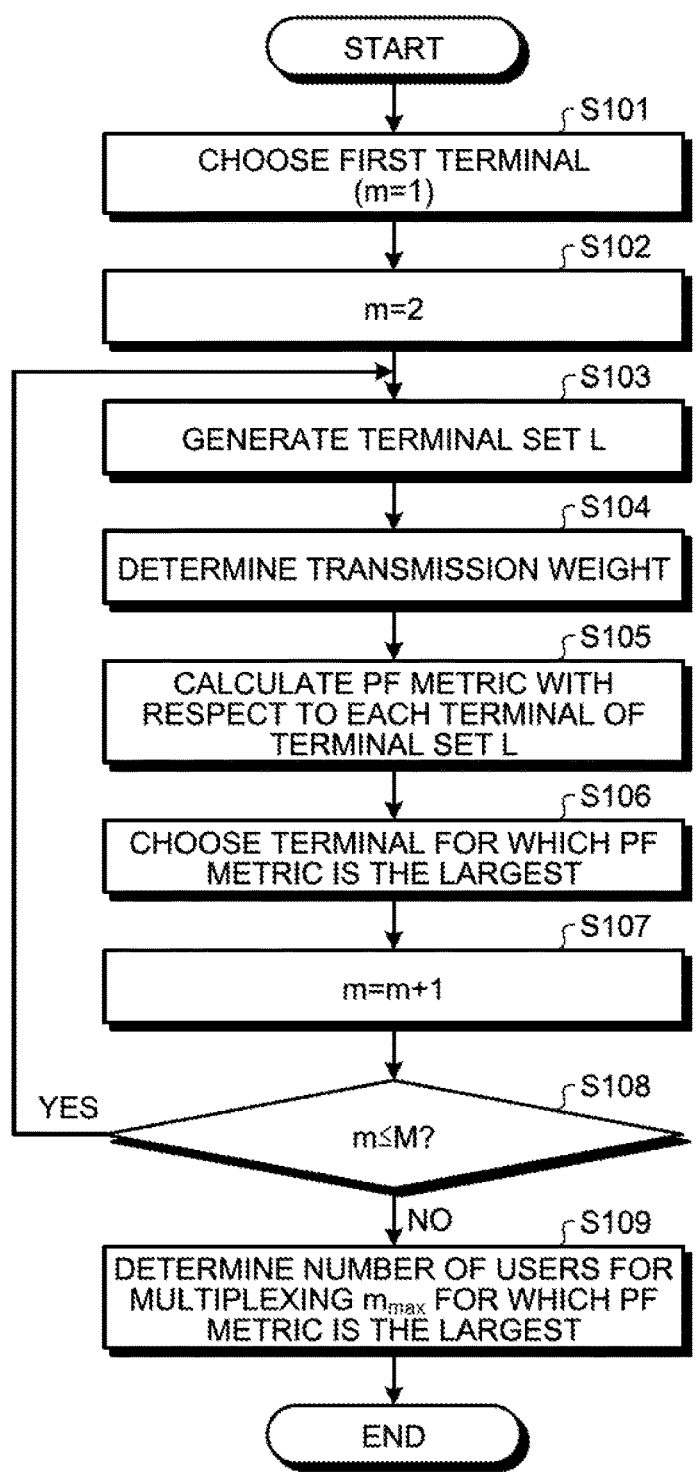
FIG. 6 is a flowchart of an exemplary scheduling processing method of the first embodiment.

First of all, the scheduling processing method performed by the base station 10 will be described with reference to FIG. 6. FIG. 6 is a flowchart of an exemplary scheduling processing method of the first embodiment. As illustrated in FIG. 6, the scheduler 20 of the base station 10 chooses the first user (the terminal 50) (step S101). The parameter m used to choose a user is set at "1" representing the first user.

The scheduler 20 increments the parameter m by 1 (step S102). In other words, the parameter m is set at "2" representing the second user.

The scheduler 20 chooses a m-th user as follows: the scheduler 20 generates a terminal set L that is a set of terminals satisfying the condition previously determined on the basis of the degree of freedom of the transmitting antennas (step S103).

The scheduler 20 determines a "transmission weight" corresponding to each of the terminals 50 on the basis of the channel matrix that is estimated by the channel estimator 18 (step S104). In other words, the scheduler 20 determines a "transmission weight" corresponding to each of the terminals such that the "transmission weight" is orthogonal to the current channel matrix and a past channel matrix with respect to the terminal 50 that is a subject of interference. The "number of samples" of the current channel matrix and the past channel matrix to which the "transmission weight" is to be orthogonal is controlled with a control value that is output from the number-of-samples controller 23. The scheduler 20 then calculates an instantaneous SNR of a l-th user (the terminal 50) in a user combination S in a case where multiuser MIMO transmission to the user combination S is performed.

The scheduler 20 calculates an PF metric with respect to each of the terminals 50 of the terminal set L (step S105). The scheduler 20 chooses, as a m-th user, i.e., a scheduling target, a user for which the PF metric is the largest (step S106). In this manner, the scheduler 20 chooses, among the terminals 50, the terminal 50 that satisfies the predetermined condition based on the degree of freedom of the transmitting antennas as a scheduling target and excludes the terminal 50 not satisfying the condition from scheduling targets.

The scheduler 20 increments the parameter m by only one (step S107). When the parameter m does not reach the maximum-multiplexing-number M that is the maximum value of the number of users for multiplexing (YES at step S108), the scheduler 20 returns to step S1.

On the other hand, when the parameter m reaches the maximum-multiplexing-number M (NO at step S108), the scheduler 20 determines the parameter m with which the PF metric is the largest as the number of users for multiplexing $m_{max}$ (step S109).

In the scheduling processing method illustrated in FIG. 6, choosing a m-th user is repeated until the parameter m reaches the maximum-multiplexing-number M; however, the technology disclosed herein is not limited to this. For example, even in the case where the parameter m does not reach the maximum-multiplexing-number M, when a given condition is satisfied, choosing a user may be stopped. The scheduling method performed by the base station 10 according to Modification 1 will be described with reference to FIG. 7.

Figure 7:
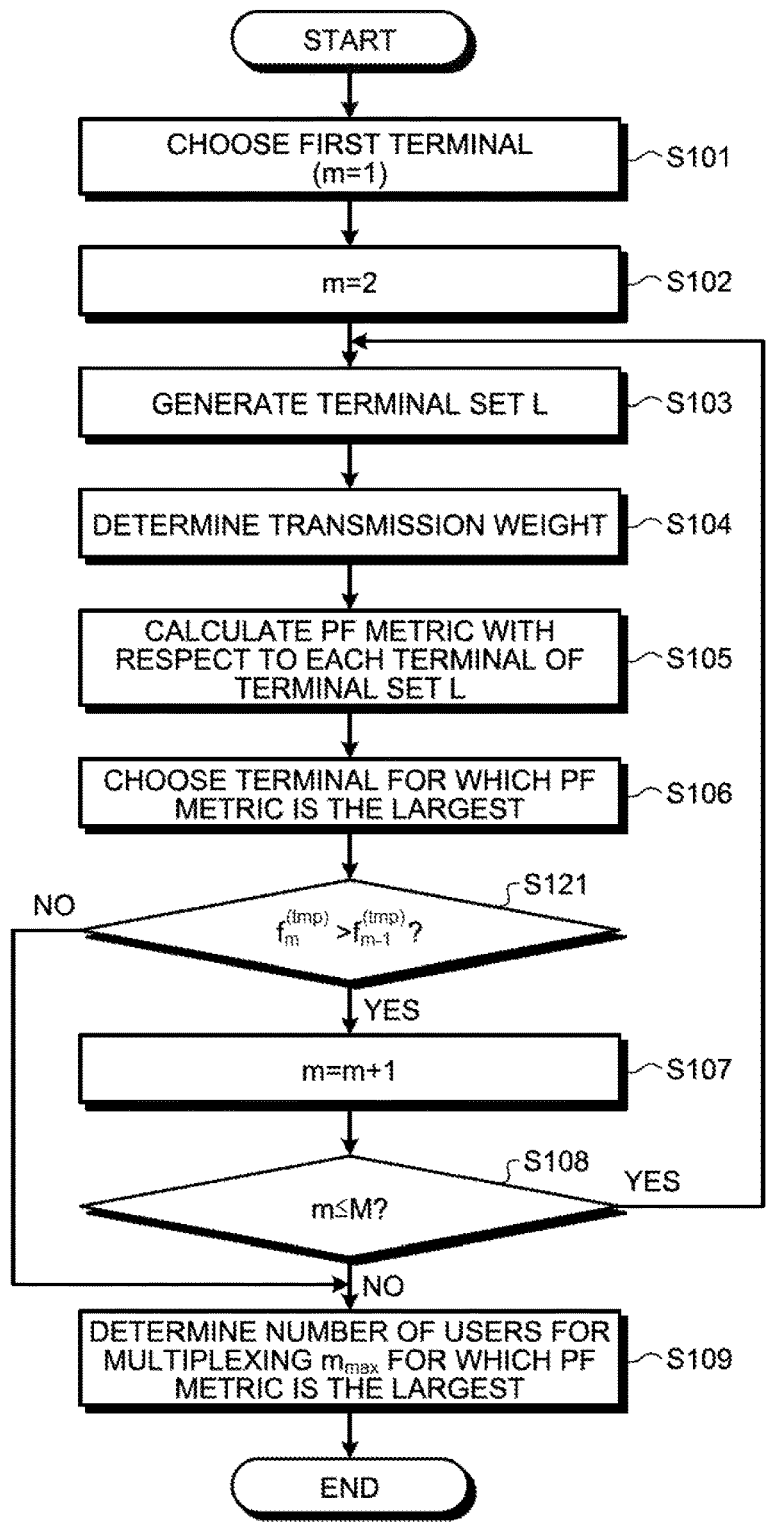
FIG. 7 is a flowchart of an exemplary scheduling processing method of Modification 1.

FIG. 7 is a flowchart of an exemplary scheduling processing method according to Modification 1. As FIG. 7 contains the same processing as that illustrated in FIG. 6, common steps are denoted with the same reference numerals and detailed descriptions thereof will be omitted. Specifically, sets of processing at steps S101 to S109 illustrated in FIG. 7 correspond respectively to the sets of processing at steps S101 to S109 illustrated in FIG. 6.

As illustrated in FIG. 7, when the scheduler 20 chooses a terminal for which the PF metric is the largest as a m-th user, i.e., a scheduling target (step S106), the scheduler 20 performs the following processing: the scheduler 20 determines whether a "metric condition" representing that the largest PF metric $f_m^{(tmp)}$ with respect to the m-th user is larger than the largest PF metric $f_{m-1}^{(tmp)}$ with respect to a(m−1)-th user is satisfied (step S121). When the above-described "metric condition" is satisfied (YES at step S121), the process moves to step S107.

On the other hand, when the "metric condition" is not satisfied (NO at step S121), the process moves to step S109. At step S109, the scheduler 20 determines a parameter m with which the PF metric is the largest as the number of users for multiplexing $m_{max}$.

Figure 8:
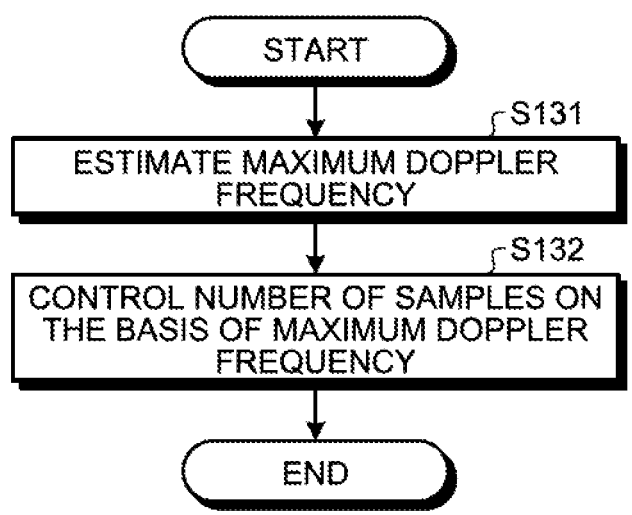
FIG. 8 is a flowchart of an exemplary method of controlling the "number of samples" of the first embodiment.

The method of controlling the "number of samples" performed by the base station 10 will be described with reference to FIG. 8. FIG. 8 is a flowchart of an exemplary method of controlling the "number of samples" according to the first embodiment. The method of controlling the "number of samples" illustrated in FIG. 8 is executed when the scheduler 20 determines a "transmission weight", i.e., when the processing at step S104 in FIG. 6 is executed.

As illustrated in FIG. 8, the maximum doppler frequency estimator 22 of the base station 10 estimates a maximum doppler frequency with respect to each of the terminals 50 by using the channel matrix that is estimated by the channel estimator 18 (step S131).

The number-of-samples controller 23 controls the "number of samples" on the basis of the maximum doppler frequency with respect to the terminal 50 that is a subject of interference, which is the maximum doppler frequency estimated by the maximum doppler frequency estimator 22 (step S132).

As described above, according to the first embodiment, in the base station 10, the channel estimator 18 estimates a channel matrix with respect to each of the terminals 50. On the basis of the channel matrix, the scheduler 20 determines a "transmission weight" corresponding to each of the terminals 50 such that the "transmission weight" is orthogonal to a current channel matrix and a past channel matrix with respect to the terminal 50 that is a subject of interference. The number-of-samples controller 23 controls, with respect to each of the terminals 50, the "number of samples" of the current channel matrix and the past channel matrix to which the "transmission weight" is to be orthogonal.

This configuration of the base station 10 enables control on the "number of samples" of the current channel matrix and the past channel matrix to which the "transmission weigh" is to be orthogonal, which makes it possible to properly change the number of users for multiplexing in MIMO communications that increases of decreases according to the "number of samples". As a result, it is possible to maintain the throughput while suppressing interference between users resulting from varying channels.

The base station 10 includes the maximum doppler frequency estimator 22 that estimates a maximum doppler frequency with respect to each of the terminals 50 by using the channel matrix. The number-of-samples controller 23 controls the "number of samples" on the basis of the maximum doppler frequency with respect to the terminal 50 that is a subject of interference.

This configuration of the base station 10 makes it possible to properly change the number of users for multiplexing in MIMO communications that increases and decreases according to the "number of samples" and, as a result, keep the throughput stable.

In the base station 10, the scheduler 20 chooses the terminal 50 satisfying the predetermined condition based on the freedom of the transmitting antennas as a scheduling target and excludes the terminal 50 not satisfying the condition from scheduling targets.

This configuration of the terminal 10 makes it possible to reduce the number of scheduling targets and, as a result, reduce the amount of scheduling processing.

The example has been described where the scheduler 20 sequentially chooses a user by using Equation (6). Alternatively, a user may be chosen with respect to each user combination. In other words, the scheduler 20 generates a user (terminal) combination set C that is a set of a combination of users (terminals) that satisfy the predetermined condition based on the freedom of the transmitting antennas by using the following Equation (3).

$$C = \left\{ C \in A : N_{rx} \cdot \max_{j \le m} \left( \sum_{l=1, l \ne j}^{m} N_{ref, k_c, l} \right) \le N_{tx} - N_{rx} \right\} \quad (23)$$

In Equation (23), A denotes a complete set of combinations of users of the number of users for multiplexing equal to or smaller than the maximum-multiplexing-number M.

The scheduler 20 then chooses a user (the terminal 50) for which the PF metric is the largest as a m-th user by using the following Equation (24).

$$c_m = \underset{c \in C}{\mathrm{argmax}} \left[ \sum_{l=1}^{m} R_{k_c, l}^{-1} r(\gamma_{l|c}^{(ZF)}) \right] \quad (24)$$

The example has been described where the scheduler 20 chooses a user (the terminal 50) by using a PF metric. Alternatively, a user (the terminal 50) may be chosen by using a scheduling metric other than the PF metric.

[b] Second Embodiment

A second embodiment is different from the first embodiment in that the base station controls, in addition to the "number of samples", a "cycle" at which a channel matrix is estimated.

Configuration of Base Station

Figure 9:
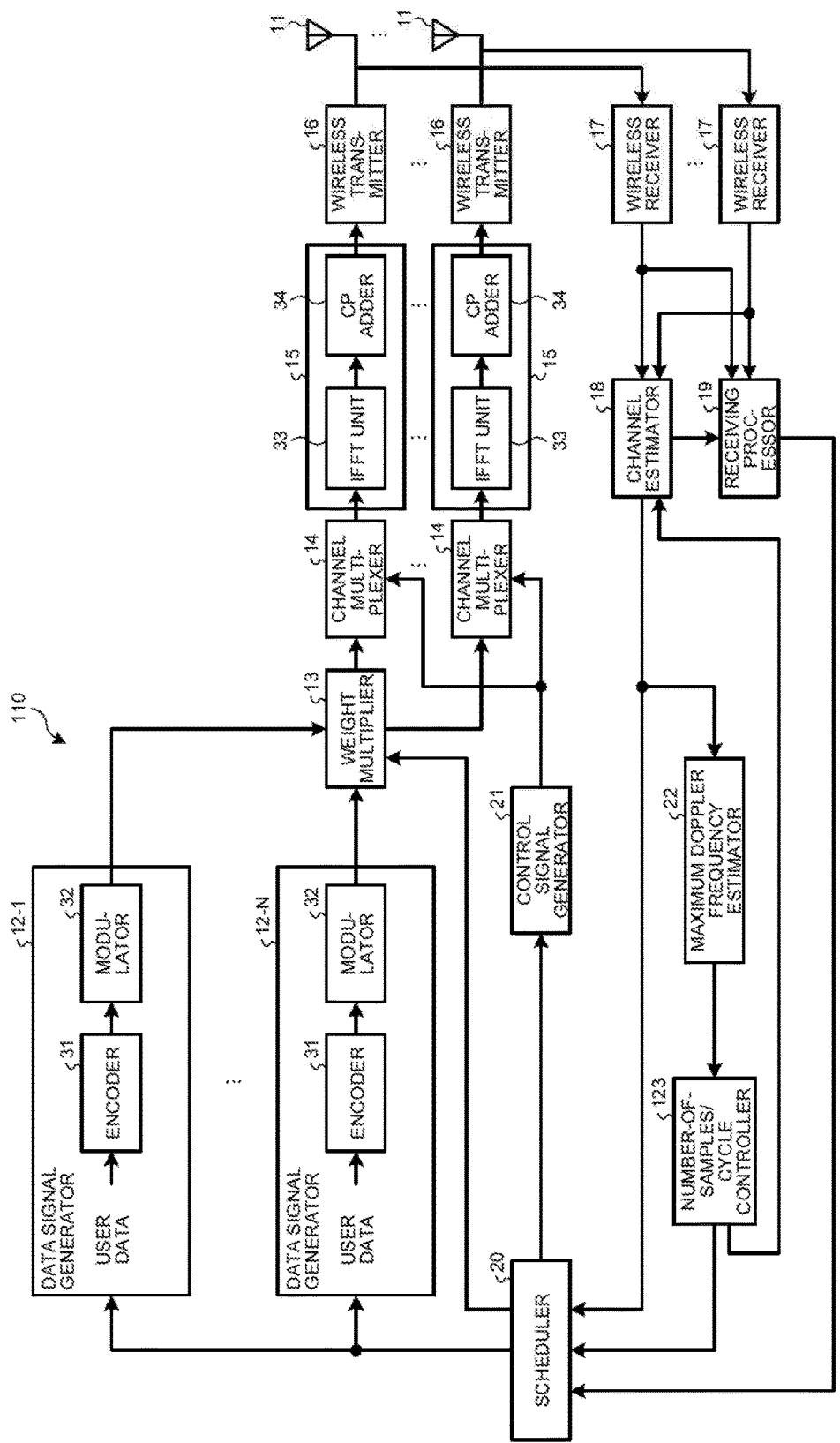
FIG. 9 is a block diagram of an exemplary base station of a second embodiment.

FIG. 9 is a block diagram of an exemplary base station of the second embodiment. As the components in FIG. 9 denoted with the same reference numerals as those in FIG. 3, excluding the aspect to be described below, have the same or similar functions as or to those illustrated in FIG. 3, descriptions thereof will be omitted. According to FIG. 9, a base station 110 includes a number-of-samples/cycle controller 123.

When the scheduler 20 determines a "transmission weight", the number-of-samples/cycle controller 123 controls, with respect to each of the terminals 50, the "number of samples" of a current channel matrix and a past channel matrix to which the "transmission weight" is to be orthogonal. Furthermore, the number-of-samples/cycle controller 123 controls, with respect to each of the terminals 50, a cycle at which the channel estimator 18 estimates a channel matrix (hereinafter, referred to as the "cycle"). Specifically, the number-of-samples/cycle controller 123 controls the "number of samples" and the "cycle" on the basis of the maximum doppler frequency with respect to the terminal 50 that is a subject of interference, which is the maximum doppler frequency estimated by the maximum doppler frequency estimator 22. For example, the number-of-samples/cycle controller 123 holds a number-of-samples/cycle table in which the "number of samples" and the "cycle" are associated with each other with respect to each range of maximum doppler frequency. The number-of-samples/cycle controller 123 refers to the number-of-samples/cycle table and determines the "number of samples" and a "cycle" corresponding to the maximum doppler frequency with respect to the terminal of interference, which is the maximum doppler frequency estimated by the maximum doppler frequency estimator 22. The number-of-samples/cycle controller 123 then outputs the determined "number of samples" and "cycle" as control values to the scheduler 20 and the channel estimator 18, respectively.

Figure 10:
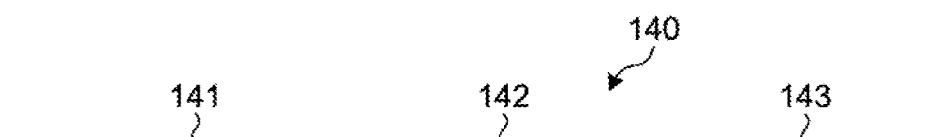
FIG. 10 is a diagram of an exemplary number-of-samples/cycle table of the second embodiment.

FIG. 10 is a diagram of an exemplary number-of-samples/cycle table of the second embodiment. A number-of-samples/cycle table 140 represented in FIG. 10 holds a number-of-samples 142 and a cycle 143 in association with a maximum doppler frequency range 141. In the example represented in FIG. 10, the larger the absolute value of each maximum doppler frequency that belongs to the maximum doppler frequency range 141 is, the larger the number-of-samples 142 and the cycle 143 are.

The procedure of determining the "number of samples" and a "cycle" will be described by using a specific example. For example, assume that the maximum doppler frequency with respect to the terminal 50 that is a subject of interference, which is the maximum doppler frequency estimated by the maximum doppler frequency estimator 22, is "3 Hz". In this case, the number-of-samples/cycle controller 123 refers to the number-of-samples/cycle table 140 exemplified in FIG. 10 and, as the maximum doppler frequency "3 Hz" belongs to the range "1 to 5 Hz", the number-of-samples controller 23 determines that the "number of samples" is "2" and the "cycle" is "5 ms".

When the number-of-samples/cycle controller 123 controls the "number of samples" and the "cycle", the two matrices represented in Equations (10) are replaceable with the two matrices represented by the following Equations (25).

$$\tilde{F}_{l|S} = [\tilde{H}_S^T G_1^T \ldots G_{l-1}^T G_{l+1}^T \ldots G_{|S|}^T]^T$$

$$G_{l'} = [H_{k_{S,l'}}^T (t - T_{int,k_{S,l'}}) H_{k_{S,l'}}^T (t - 2T_{int,k_{S,l'}}) \ldots H_{k_{S,l'}}^T (t - (N_{ref,k_{S,l'}} - 1) T_{int,k_{S,l'}})]^T \quad (25)$$

In Equation (25), $T_{int,k}$ denotes a "cycle" with respect to a user #k.

Exemplary Operations of Base Station

Exemplary processing operations performed by the base station 110 of the second embodiment having the above-described configuration will be described. Particularly, the method of controlling the "number of samples" and the "cycle" performed by the base station 110 will be described.

Figure 11:
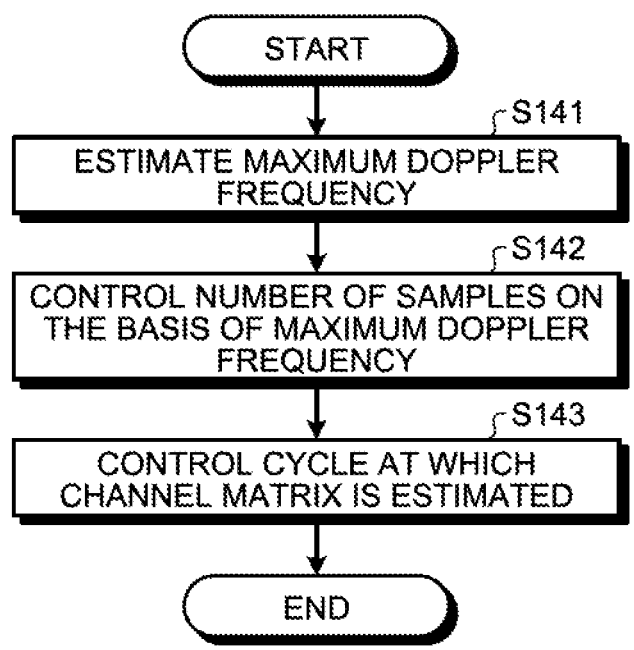
FIG. 11 is a flowchart of an exemplary method of controlling the "number of samples" and a "cycle" of the second embodiment.

FIG. 11 is a flowchart of an exemplary method of controlling the "number of samples" and a "cycle" of the second embodiment. The method of controlling the "number of samples" illustrated in FIG. 11 is executed when the scheduler 20 determines a "transmission weight", i.e., executes the processing at step S104 in FIG. 6.

As illustrated in FIG. 11, the maximum doppler frequency estimator 22 estimates a maximum doppler frequency with respect to each of the terminals 50 by using the channel matrix that is estimated by the channel estimator 18 (step S141).

The number-of-samples/cycle controller 123 controls the "number of samples" on the basis of the maximum doppler frequency with respect to the terminal 50 that is a subject of interference, which is the maximum doppler frequency estimated by the maximum doppler frequency estimator 22 (step S142).

The number-of-samples/cycle controller 123 further controls the "cycle" on the basis of the maximum doppler frequency with respect to the terminal 50 that is a subject of interference, which is the maximum doppler frequency estimated by the maximum doppler frequency estimator 22 (step S143).

As described above, according to the second embodiment, in the base station 110, when a "transmission weight" is determined, the number-of-samples/cycle controller 123 controls the "number of samples" and the "cycle" with respect to each of the terminals 50.

This configuration of the base station 110 makes it possible to properly change the number of users for multiplexing in MIMO communications that increases and decreases according to the "number of samples" and the "cycle". As a result, it is possible to maintain the throughput while suppressing interference between users resulting from varying channels.

In the base station 110, the number-of-samples/cycle controller 123 controls the "number of samples" and the "cycle" on the basis of the maximum doppler frequency with respect to the terminal 50 that is a subject of interference.

This configuration of the base station 110 makes it possible to properly change the number of users for multiplexing in MIMO communications that increases or decreases according to the "number of samples" and the "cycle" and, as a result, keep the throughput more stable.

Third Embodiment

A third embodiment generally relates to a variation of the method of controlling the "number of samples" of the first embodiment.

Exemplary Configuration of Base Station

Figure 12:
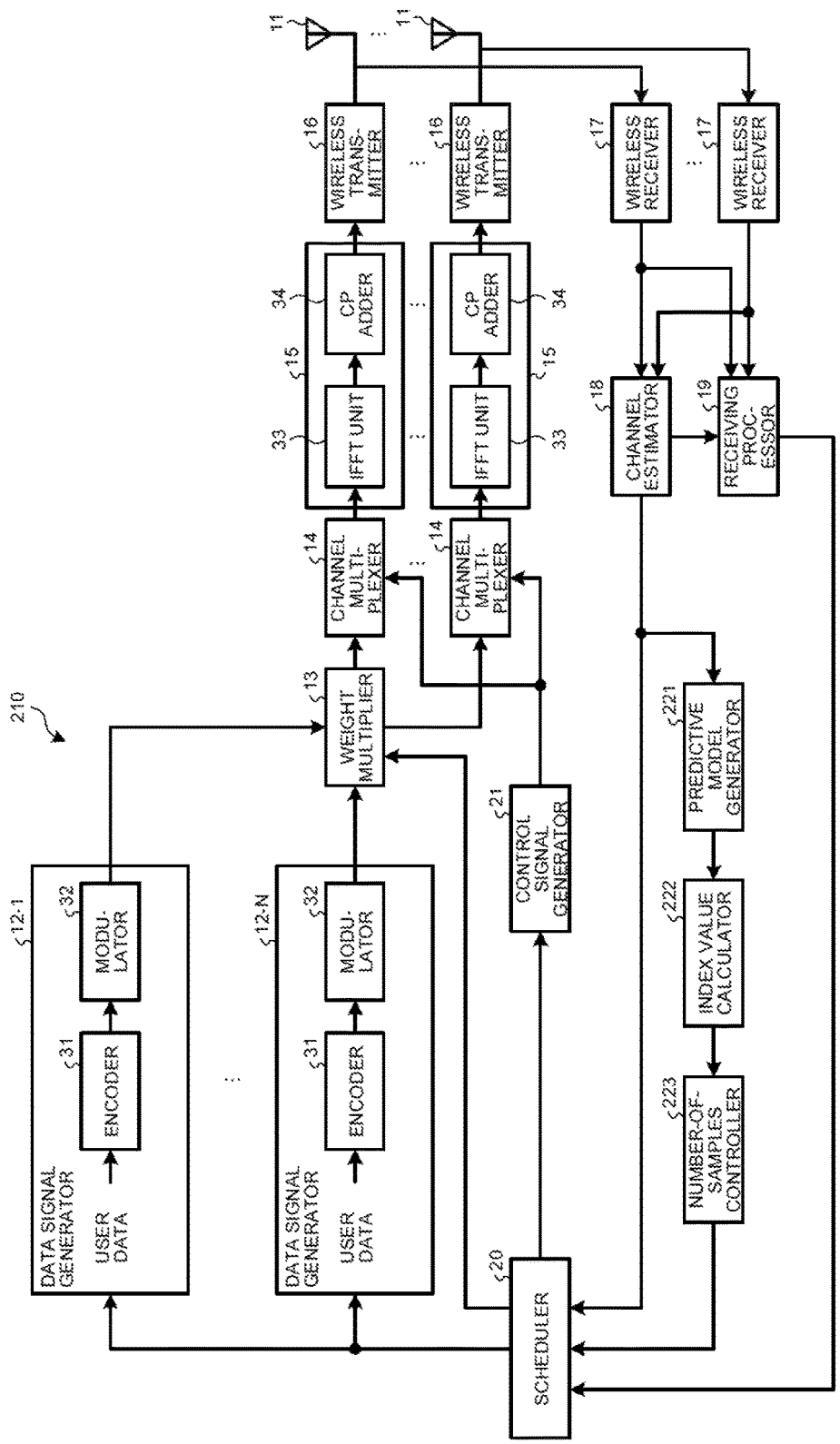
FIG. 12 is a block diagram of an exemplary base station of a third embodiment.

FIG. 12 is a block diagram of an exemplary base station of a third embodiment. As the components in FIG. 12 denoted with the same reference numerals as those in FIG. 3, excluding the aspect to be described below, have the same or similar functions as or to those illustrated in FIG. 3, descriptions thereof will be omitted. According to FIG. 12, a base station 210 includes a predictive model generator 221, an index value calculator 222, and a number-of-samples controller 223.

The predictive model generator 221 uses the channel matrix estimated by the channel estimator 18 to generate, with respect to the terminal 50 that is a subject of interference, a vector matrix obtained by re-arranging the column vectors of the channel matrices into a single column vector and generates a predictive model of the vector matrix by using a liner combination of a past vector matrix. The vector matrix of the user #k is expressed by, for example, the following Equation (26). The predictive model of the vector matrix is expressed by, for example, the following Equation (27).

$$b_\tau = [\{(H_k(t+\tau T_{ch}))_1\}^T \{(H_k(t+\tau T_{ch}))_2\}^T \ldots \{H_k(t+\tau T_{ch}))_{N_{tx}}\}^T]^T \quad (26)$$

$$b_\tau = \sum_{j=1}^{n_{ref}} a_j b_{\tau-j} + \varepsilon_\tau \quad (27)$$

In Equation (27), $a_j$ denotes a coefficient of linear combination (hereinafter, referred to as a "predictive coefficient") and $\varepsilon_\tau$ denotes an error of the predictive model.

Once the following Equation (28) is defined, the predictive model of the vector matrix is rewritten from Equation (27) into the following Equation (29).

$$B_\tau = [b_{\tau-1} b_{\tau-2} \ldots b_{\tau-n_{ref}}]$$

$$a = [a_1 a_2 \ldots a_{\tau-n_{ref}}]^T \quad (28)$$

$$b_\tau = B_\tau a + \varepsilon_\tau \quad (29)$$

The index value calculator 222 calculates an index value for evaluating the predictive model that is generated by the predictive model generator 221. In the third embodiment, an Akaike's information criterion (AIC) value is calculated as the index value. First of all, the index value calculator 222 estimates a "predictive coefficient" in the predictive model. The "predictive coefficient" is, for example, estimated by performing the least squares method or the maximum-likelihood method on the vector matrix of the $N_{train}$ sample. The "predictive coefficient" estimated by the index value calculator 222 is, for example, expressed by the following Equation (30).

$$\hat{a} = \left( \sum_{\tau=-N_{train}+1}^{0} B_\tau^H B_\tau \right)^{-1} \sum_{\tau=-N_{train}+1}^{0} B_\tau^H B_\tau \quad (30)$$

The index value calculator 222 applies the estimated "predictive coefficient" to Equation (29) to calculate the error of the predictive model. The error of the predictive model calculated by the index value calculator 222 is, for example, expressed by the following Equation (31).

$$\hat{\varepsilon}_\tau = b_\tau - B_\tau \hat{a}, -N_{train}+n_{ref}+1 \leq \tau \leq 0 \quad (31)$$

In Equation (31), $n_{ref}$ denotes a parameter used to search for the "number of samples".

The index value calculator 222 then calculates an average of the calculated error by using the following Equation (32).

$$\mu_\varepsilon = \frac{1}{N_{train} - n_{ref}} \sum_{\tau=-N_{train}+n_{ref}+1}^{0} \hat{\varepsilon}_\tau \quad (32)$$

The index value calculator 222 then calculates a covariance matrix by using the following Equation (33).

$$C_\varepsilon = \sum_{\tau=-N_{train}+n_{ref}+1}^{0} (\hat{\varepsilon}_\tau - \mu_\varepsilon)(\hat{\varepsilon}_\tau - \mu_\varepsilon)^H \quad (33)$$

The index value calculator 222 then calculates a log likelihood by using the following Equation (34).

$$L_{max} = -\frac{N_{train} - n_{ref}}{2}\log\det C_\varepsilon + \sum_{\tau=-N_{train}+n_{ref}+1}^{0} \frac{1}{2}(\hat{\varepsilon}_\tau - \mu_\varepsilon)^H C_\varepsilon^{-1}(\hat{\varepsilon}_\tau - \mu_\varepsilon) \quad (34)$$

The index value calculator 222 then calculates an AIC value by using the following Equation (35).

$$AIC(n_{ref}) = -2L_{max} + 2(2_{ref}+1) \quad (35)$$

The number-of-samples controller 223 controls the "number of samples" on the basis of the index value that is calculated by the index value calculator 222, i.e., the AIC value. Specifically, the number-of-samples controller 223 determines the "number of samples" with which the AIC value is the smallest and outputs the determined "number of samples" as a control value to the scheduler 20.

$$N_{ref,k} = \underset{n_{ref}}{\operatorname{argmin}} AIC(n_{ref}) \quad (36)$$

Operations of Base Station

Figure 13:
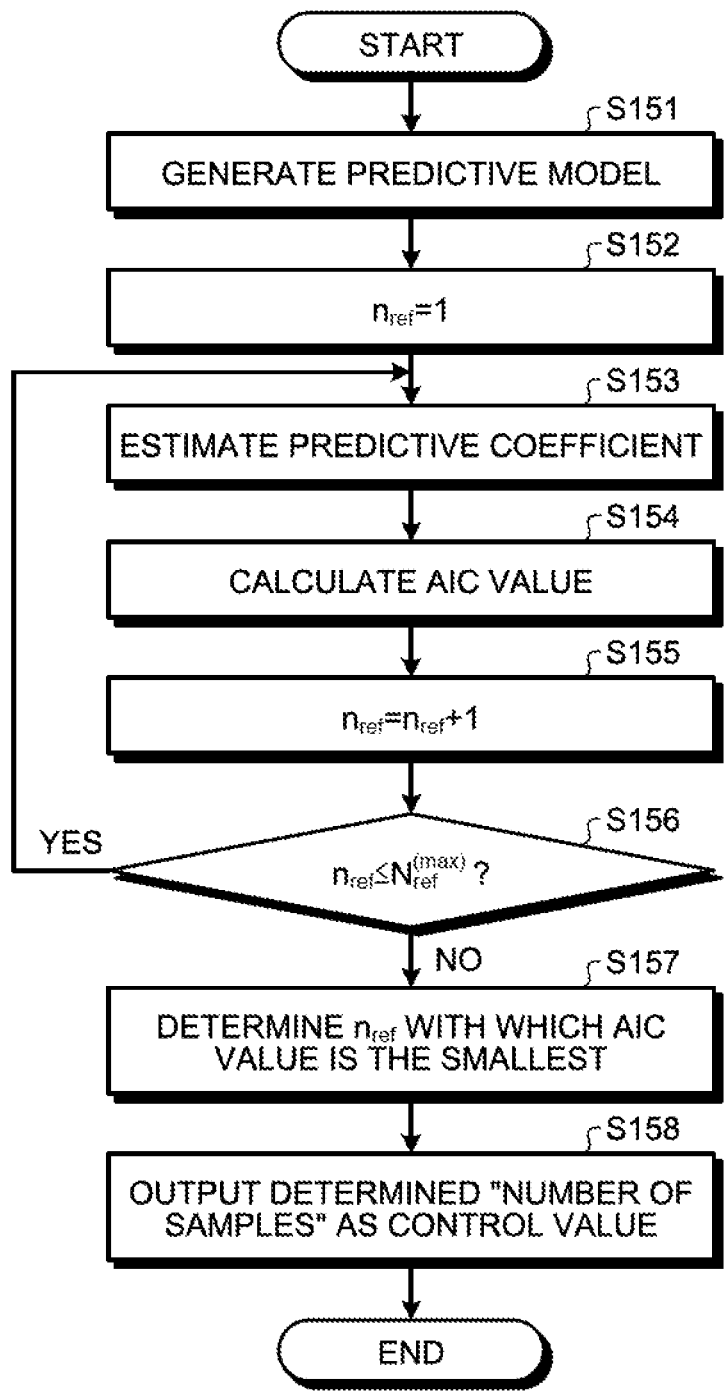
FIG. 13 is a flowchart of an exemplary method of controlling the "number of samples" of the third embodiment.

Exemplary processing operations of the base station 210 of the third embodiment having the above-described configuration will be described. Particularly, the method of controlling the "number of samples" performed by the base station 210 will be described. FIG. 13 is a flowchart of an exemplary method of controlling the "number of samples" of the third embodiment. The method of controlling the "number of samples" illustrated in FIG. 13 is executed when the scheduler 20 determines a "transmission weight", i.e., when the processing at step S104 in FIG. 6 is executed.

As illustrated in FIG. 13, the predictive model generator 221 of the base station 210 uses the estimated channel matrix to generate a vector matrix with respect to the terminal 50 that is a subject of interference and generates a predictive model of the vector matrix by using a linear combination of a past vector matrix (step S151).

The index value calculator 222 sets the parameter $n_{ref}$ that is used to search for the "number of samples" at "1" (step S152).

The index value calculator 222 estimates a "predictive coefficient" in the predictive model that is generated by the predictive model generator 221 (step S153).

The index value calculator 222 then calculates an AIC value for evaluating the predictive model (step S154).

The index value calculator 222 increments the parameter $n_{ref}$ only by one (step S155).

The index value calculator 222 determines whether the parameter $n_{ref}$ is equal to or smaller than a pre-set maximum value $N_{ref}^{(max)}$ of the parameter $n_{ref}$ (step S156).

When the parameter $n_{ref}$ is equal to or smaller than the maximum value (YES at step S156), the index value calculator 222 returns to step S153.

On the other hand, when the parameter $n_{ref}$ exceeds the maximum value (NO at step S156), the process moves to step S157.

The number-of-samples controller 223 determines the parameter $n_{ref}$ with which the AIC value is the smallest as the "number of samples" (step S157) and outputs the determined "number of samples" as a control value to the scheduler 20 (step S158).

There are not necessarily the smallest value of the AIC value. For this reason, the number-of-samples controller 223 may determine, by using the following Equation (37), the smallest $n_{ref}$ under the condition that the absolute value of the error between the AIC value of the parameter $n_{ref}$ and the AIC value in the parameter ($n_{ref}+1$) is equal to or smaller than a given threshold dth.

$$N_{ref,k} = \underset{n_{ref}}{\operatorname{argmin}} n_{ref} \text{ subject to } |AIC(n_{ref}+1) - AIC(n_{ref})| \leq d_{th}, \quad (37)$$

$$1 \leq n_{ref} \leq N_{ref}^{(max)} - 1$$

Note that within the range of $2 \leq n_{ref} \leq N_{ref}^{(max)}$, when the condition that the absolute value of the difference between the AIC value in the parameter $n_{ref}$ and the AIC value in the parameter ($n_{ref}+1$) is equal to or smaller than the given threshold dth is not satisfied, the number-of-samples controller 223 determines "1" as the "number of samples".

As described above, according to the third embodiment, the base station 210 includes the predictive model generator 221 that generate a vector matrix by vectorizing the channel matrix to and generates a predictive model of the vector matrix by using the linear combination of a past vector matrix. The base station 210 includes the index value calculator 222 that calculates an index value (AIC value) for evaluating the predictive model. In the base station 210, the number-of-samples controller 223 controls the "number of samples" on the basis of the index value (AIC value) that is calculated by the index value calculator 222.

This configuration of the base station 210 makes it possible to properly change the number of users for multiplexing in MIMO communications that increases or decreases according to the "number of samples" and, as a result, keep the throughput stable.

According to the above-descriptions, the AIC value is used as the index value for evaluating the predictive model. Alternatively, another value of amount of information other than AIC value may be used.

[d] Fourth Embodiment

A fourth embodiment is different from the third embodiment in that the base station controls, in addition to the "number of samples", a "cycle" at which a channel matrix is estimated.

Exemplary Configuration of Base Station

Figure 14:
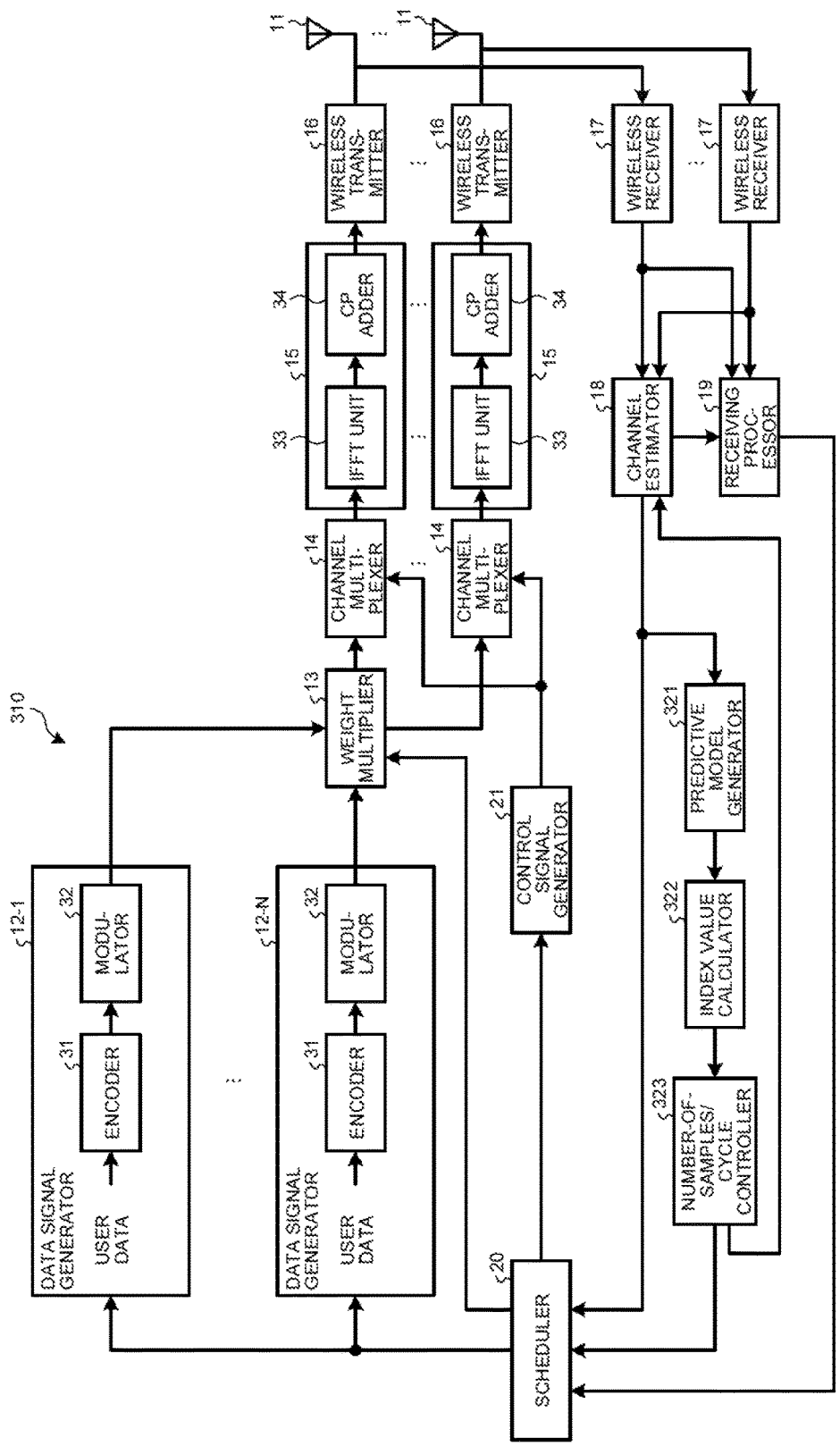
FIG. 14 is a block diagram of an exemplary base station of a fourth embodiment.

FIG. 14 is a block diagram of an exemplary base station of a fourth embodiment. As the components in FIG. 12 denoted with the same reference numerals as those in FIG. 12, excluding the aspect to be described below, have the same or similar functions as or to those illustrated in FIG. 12, descriptions thereof will be omitted. According to FIG. 14, a base station 310 includes a predictive model generator 321, an index value calculator 322, a number-of-samples/cycle controller 323.

The predictive model generator 321 uses the channel matrix estimated by the channel estimator 18 to generate, with respect to a terminal 50 that is a subject of interference, a vector matrix by vectorizing the channel matrix and generates a predictive model of the vector matrix by using a linear combination of a past vector matrix. A vector matrix of a user #k is expressed by, for example, the following Equation (38). The predictive model of the vector matrix is expressed by, for example, Equation (27).

$$b_\tau = [\{(H_k(t+\tau T_{n_{int}}))_1\}^T \{(H_k(t+\tau T_{n_{int}}))_2\}^T \ldots \{H_k(t+\tau T_{n_{int}})_{N_{tx}}\}^T]^T \quad (38)$$

In Equation (38), $T_{n_{int}}$ denotes a $n_{int}$-th possible "cycle" among $N_{int}$ possible "cycles" $T_1, T_2, \ldots, T_{N_{int}}$.

The index value calculator 322 calculates an index value for evaluating the predictive model that is generated by the predictive model generator 321. In the fourth embodiment, an AIC value is calculated as the index value. As the method of evaluating an AIC value is the same as that of the third embodiment, descriptions thereof will be omitted.

When the scheduler 20 determines a "transmission weight", the number-of-samples/cycle controller 323 controls, with respect to each of the terminals 50, the "number of samples" of a current channel matrix and a past channel matrix to which the "transmission weight" is to be orthogonal. Furthermore, the number-of-samples/cycle controller 323 controls, with respect to each of the terminals 50, a cycle at which the channel estimator 18 estimates a channel matrix. Specifically, the number-of-samples/cycle controller 323 controls the "number of samples" and the "cycle" on the basis of the index value that is calculated by the index value calculator 322, i.e., the AIC value. For example, the number-of-samples/cycle controller 323 determines the "number of samples" and a "cycle" with which the AIC value is the smallest and outputs the determined "number of samples" and the "cycle" as control values to the scheduler 20 and the channel estimator 18, respectively.

$$(T_{int,k}, N_{ref,k}) = \underset{T_{n_{int,k}}, n_{ref}}{\operatorname{argmin}} AIC(T_{n_{int}}, n_{ref}) \quad (39)$$

In Equation (39), $AIC(T_{n_{int}}, n_{ref})$ is an AIC value in a case where a $n_{int}$-th possible "cycle" $T_{n_{int}}$ and a possible "number of samples" $n_{ref}$ are used.

Exemplary Operations of Base Station

Figure 15:
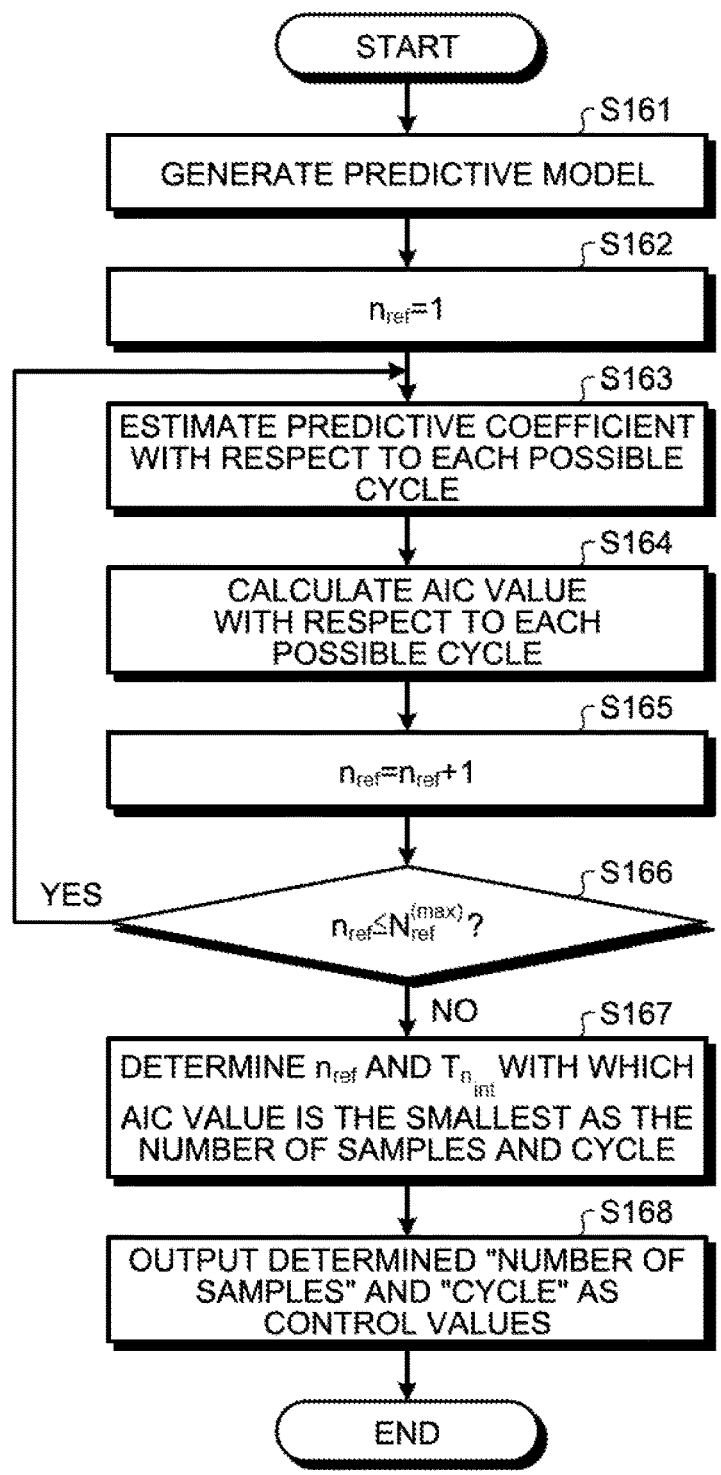
FIG. 15 is a flowchart of an exemplary method of controlling the "number of samples" and a "cycle" of the fourth embodiment.

Exemplary processing operations performed by the base station 310 of the fourth embodiment having the above-described configuration will be described. Particularly, the method of controlling the "number of samples" and a "cycle" performed by the base station 310 will be described. FIG. 15 is a flowchart of an exemplary method of controlling the "number of samples" and a "cycle" of the fourth embodiment. The method of controlling the "number of samples" illustrated in FIG. 15 is executed when the scheduler 20 determines a "transmission weight", i.e., executes the processing at step S104 in FIG. 6.

As illustrated in FIG. 15, the predictive model generator 321 of the base station 310 generates a vector matrix with respect to the terminal 50 that is a subject of interference by using the estimated channel matrix and generates a predictive model of the vector matrix by using a linear combination of a past vector matrix (step S161).

The index value calculator 322 sets a parameter $n_{ref}$ that is used to search for the "number of samples" at "1" (step S162).

The index value calculator 322 estimates a "predictive coefficient" in the predictive model that is generated by the predictive model generator 321 with respect to each possible "cycle" (step S163).

The index value calculator 322 then calculates an AIC value for evaluating the predictive model with respect to each possible "cycle" (step S164).

The index value calculator 322 increments the parameter $n_{ref}$ only by one (step S165).

The index value calculator 322 determines whether the parameter $n_{ref}$ is equal to or smaller than a predetermined maximum value $N_{ref}^{(max)}$ of the parameter $n_{ref}$ (step S166).

When the parameter $n_{ref}$ is equal to or smaller than the maximum value (YES at step S166), the index value calculator 322 returns to step S163.

On the other hand, when the parameter $n_{ref}$ exceeds the maximum value (NO at step S166), the process moves to step S167.

The number-of-samples/cycle controller 323 determines the parameter $n_{ref}$ and $T_{nint}$ with which the AIC value is the smallest as the "number of samples" and the "cycle", respectively (step S167). The number-of-samples/cycle controller 323 then outputs the determined "number of samples" and the "cycle" as control values to the scheduler 20 and the channel estimator 18, respectively (step S168).

As described above, according to the second embodiment, in the base station 310, when a "transmission weight" is determined, the number-of-samples/cycle controller 323 controls the "number of samples" and the "cycle" with respect to each of the terminals 50.

This configuration of the base station 310 makes it possible to properly change the number of users for multiplexing in MIMO communications that increases and decreases according to the "number of samples" and the "cycle". As a result, it is possible to maintain the throughput while suppressing interference between users resulting from the varying channels.

In the base station 310, the number-of-samples/cycle controller 323 controls the "number of samples" and the "cycle" on the basis of the index value (AIC value) that is calculated by the index value calculator 322.

This configuration of the base station 310 makes it possible to properly change the number of users for multiplexing in MIMO communications that increases or decreases according to the "number of samples" and the "cycle" and, as a result, keep the throughput more stable.

[e] Fifth Embodiment

A fifth embodiment relates to a variation of the method of controlling the "number of samples" of the first embodiment.

Exemplary Configuration of Base Station

Figure 16:
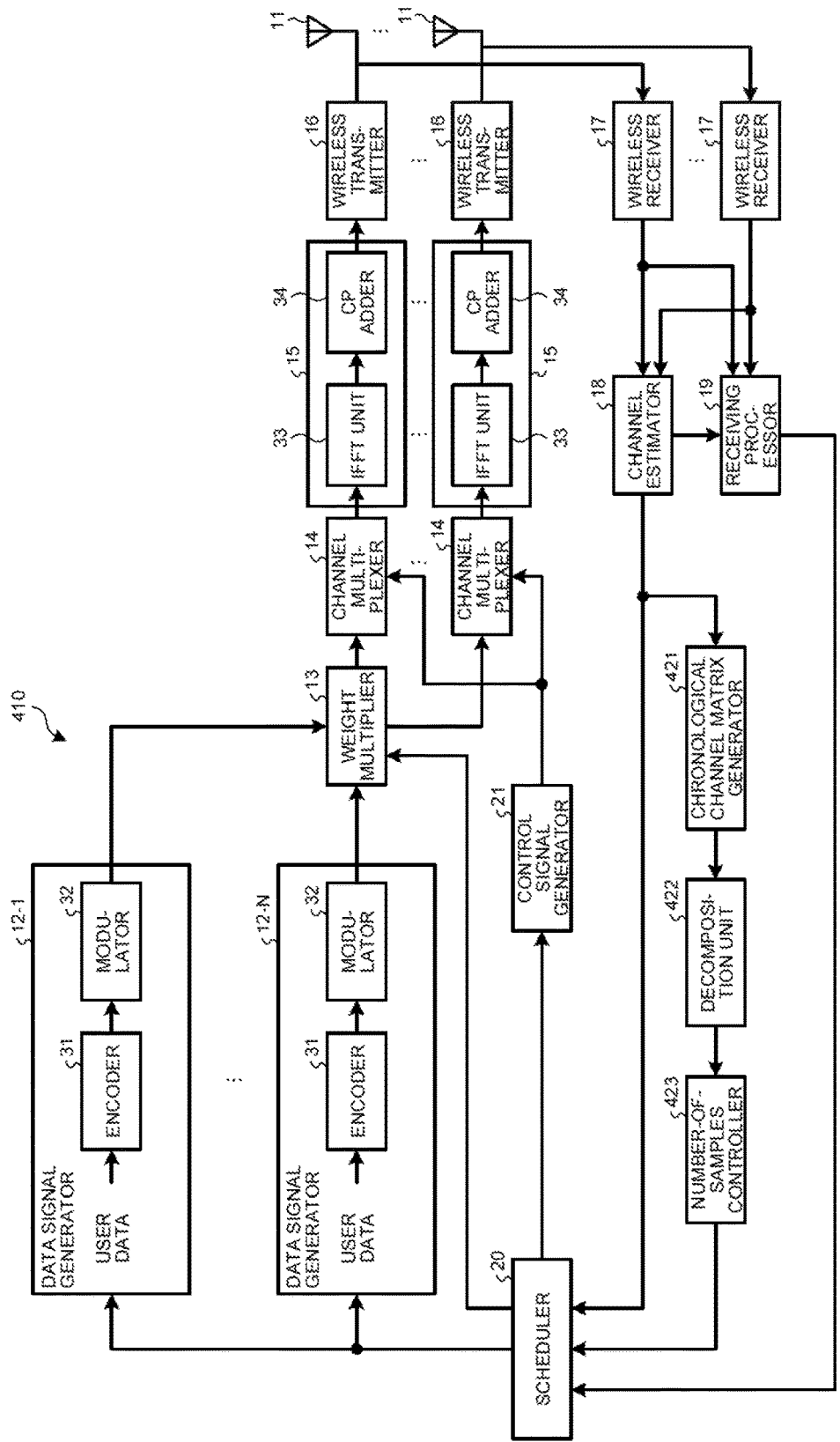
FIG. 16 is a block diagram of an exemplary base station of a fifth embodiment.

FIG. 16 is a block diagram of an exemplary base station of the fifth embodiment. As the components in FIG. 16 denoted with the same reference numerals as those in FIG. 3, excluding the aspect to be described below, have the same or similar functions as or to those illustrated in FIG. 3, descriptions thereof will be omitted. According to FIG. 16, a base station 410 includes a chronological channel matrix generator 421, a decomposition unit 422, and a number-of-samples controller 423.

The chronological channel matrix generator 421 uses the channel matrix estimated by the channel estimator 18 to generate, with respect to the terminal 50 that is a subject of interference, a vector matrix by vectorizing the channel matrix. The chronological channel matrix generator 421 generates a chronological channel matrix by combining the generated vector matrices chronologically. The vector matrix of a user #k is, for example, expressed by the following Equation (40) or the following Equation (41). The chronological channel matrix of the user #k is expressed by the following Equation (42).

$$m_k(t) = [\{(H_k(t))_1\}^T \{(H_k(t))_2\}^T \ldots \{(H_k(t))_{N_{tx}}\}^T]^T \quad (40)$$

$$m_k(t) = [\{(H_k^T(t))_1\}^T \{(H_k^T(t))_2\}^T \ldots \{(H_k^T(t))_{N_{tx}}\}^T]^T \quad (41)$$

$$M_k = [m_k(t) m_k(t-T_{ch}) \ldots m_k(t-(N_{ref}^{(max)}-1)T_{ch})] \quad (42)$$

The decomposition unit 422 performs singular value decomposition on the chronological channel matrix to acquire singular values. For example, by performing singular value decomposition on the chronological channel matrix $M_k$ represented by Equation (42), the decomposition unit 422 acquires $N_{ref}^{(max)}$ singular values, $\lambda_n$ (n=1, 2, ..., $N_{ref}^{(max)}$).

The number-of-samples controller 423 controls the "number of samples" on the basis of the singular values acquired by the decomposition unit 422. Specifically, by using the following Equation (43), the number-of-samples controller 423 determines, as the "number of samples", the number n of singular values with which the ratio of the singular values $\lambda_n$ to the total of all singular values is equal to or larger than a given threshold and outputs the determined "number of samples" as a control value to the scheduler 20.

$$N_{ref,k} = \max_n n \text{ subject to } \frac{\lambda_n}{\sum_{n=1}^{N_{ref}^{(max)}} \lambda_n} \geq \alpha_{th} \quad (43)$$

In Equation (43), the singular values $\lambda_n$ have a relation represented by the following Equation (44).

$$\lambda_1 \geq \lambda_2 \geq \ldots \geq \lambda_{N_{ref}^{(max)}} \quad (44)$$

Exemplary Operations of Base Station

Exemplary processing operations of the base station 410 of the fifth embodiment having the above-described configuration will be described. Particularly, the method of controlling the "number of samples" performed by the base station 410 will be described here. The method of controlling the "number of samples" illustrated in FIG. 17 is executed when the scheduler 20 determines a "transmission weight", i.e., executes the processing at step S104 in FIG. 6.

Figure 17:
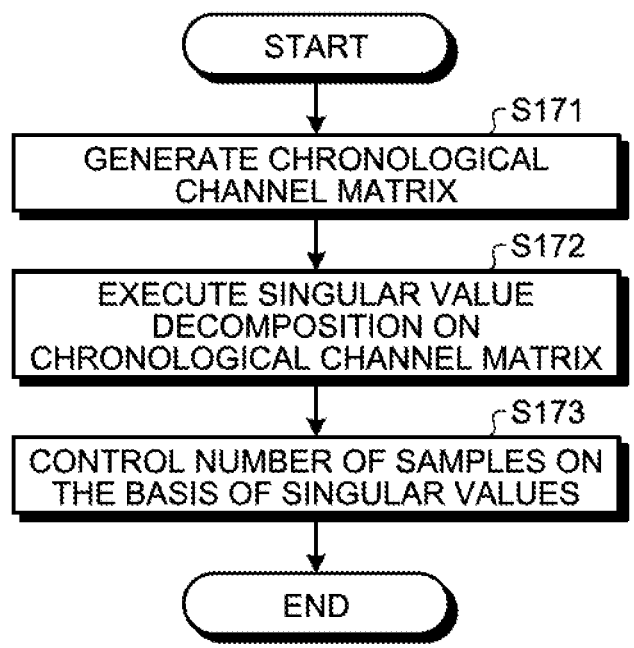
FIG. 17 is a flowchart of an exemplary method of controlling the "number of samples" of the fifth embodiment.

As illustrated in FIG. 17, the chronological channel matrix generator 421 uses the channel matrix estimated by the channel estimator 18 to generate, with respect to the terminal 50 that is a subject of interference, a vector matrix by vectorizing the channel matrix. The chronological channel matrix generator 421 generates a chronological channel matrix by combining the generated vector matrices chronologically (step S171).

The decomposition unit 422 acquires singular values by performing singular value decomposition on the chronological channel matrix (step S172).

The number-of-samples controller 423 controls the "number of samples" on the basis of the singular values that are acquired by the decomposition unit 422 (step S173).

As described above, according to the fifth embodiment, the base station 410 includes the chronological channel matrix generator 421 that uses the channel matrix to generate, with respect to the terminal 50 that is a subject of interference, a vector matrix by vectorizing the channel matrix and that generates a chronological channel matrix by combining the vector matrices. The base station 410 further includes the decomposition unit 422 that acquires singular values by performing singular value decomposition on the chronological channel. In the base station 410, the number-of-samples controller 423 controls the "number of samples" on the basis of the singular values acquired by the decomposition unit 422.

This configuration of the base station 40 makes it possible to properly change the number of users for multiplexing in MIMO communications that increases and decreases according to the "number of samples" and, as a result, keep the throughput stable.

The example where the base station 410 controls the "number of samples" on the basis of the singular values has been described; however, the base station 410 may control the "number of samples" on the basis of eigenvalues. In this case, the decomposition unit 422 performs eigenvalue decomposition on the chronological channel matrix to acquire eigenvalues. The number-of-samples controller 423 controls the "number of samples" on the basis of the eigenvalues acquired by the decomposition unit 422. For example, the number-of-samples controller 423 determines, as the "number of samples", the number of eigenvalues with which the ratio of the eigenvalues to the total of all eigenvalues is equal to or larger than a given threshold and outputs the determined "number of samples" as a control value to the scheduler 20.

[f] Sixth Embodiment

A sixth Embodiment is different from the first embodiment in that a terminal determines the "number of samples" and sends the "number of samples" as a feedback to the base station.

Exemplary Configuration of Base Station

Figure 18:
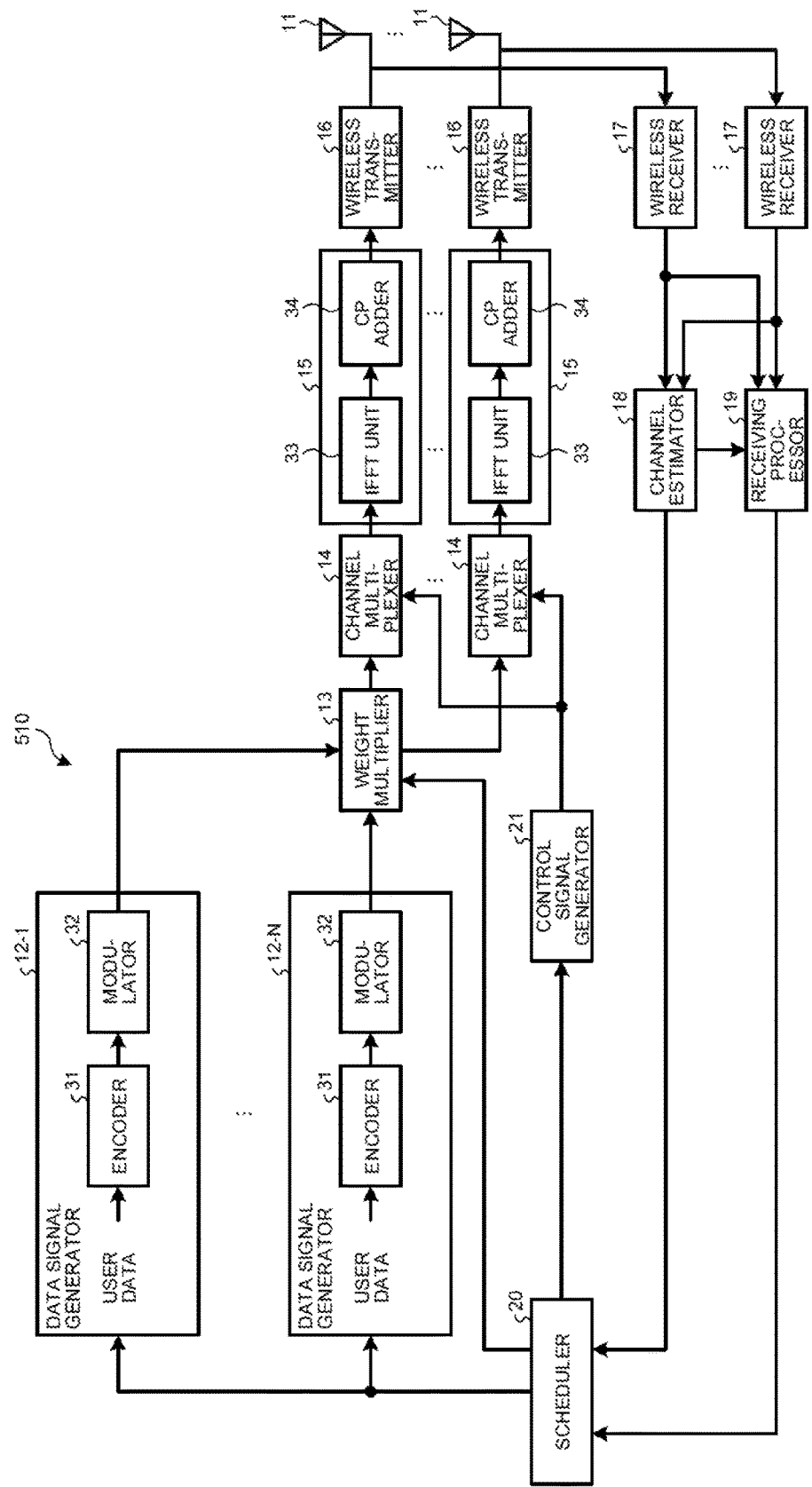
FIG. 18 is a block diagram of an exemplary base station of a sixth embodiment.

FIG. 18 is a block diagram of an exemplary base station of the sixth embodiment. As the components in FIG. 18 denoted with the same reference numerals as those in FIG. 3, excluding the aspect to be described below, have the same or similar functions as or to those illustrated in FIG. 3, descriptions thereof will be omitted. According to FIG. 18, a base station 510 does not include the maximum doppler frequency estimator 22 and the number-of-samples controller 23. The scheduler 20 determines, on the basis of the channel matrix and the "number of samples" that is sent from a terminal 150 as a feedback, a transmission weight corresponding to each of the terminals 150 such that the transmission weight is orthogonal to the a current channel matrix and a past channel matrix with respect to the terminal 150 that is a subject of interference.

Configuration of Terminal

Figure 19:
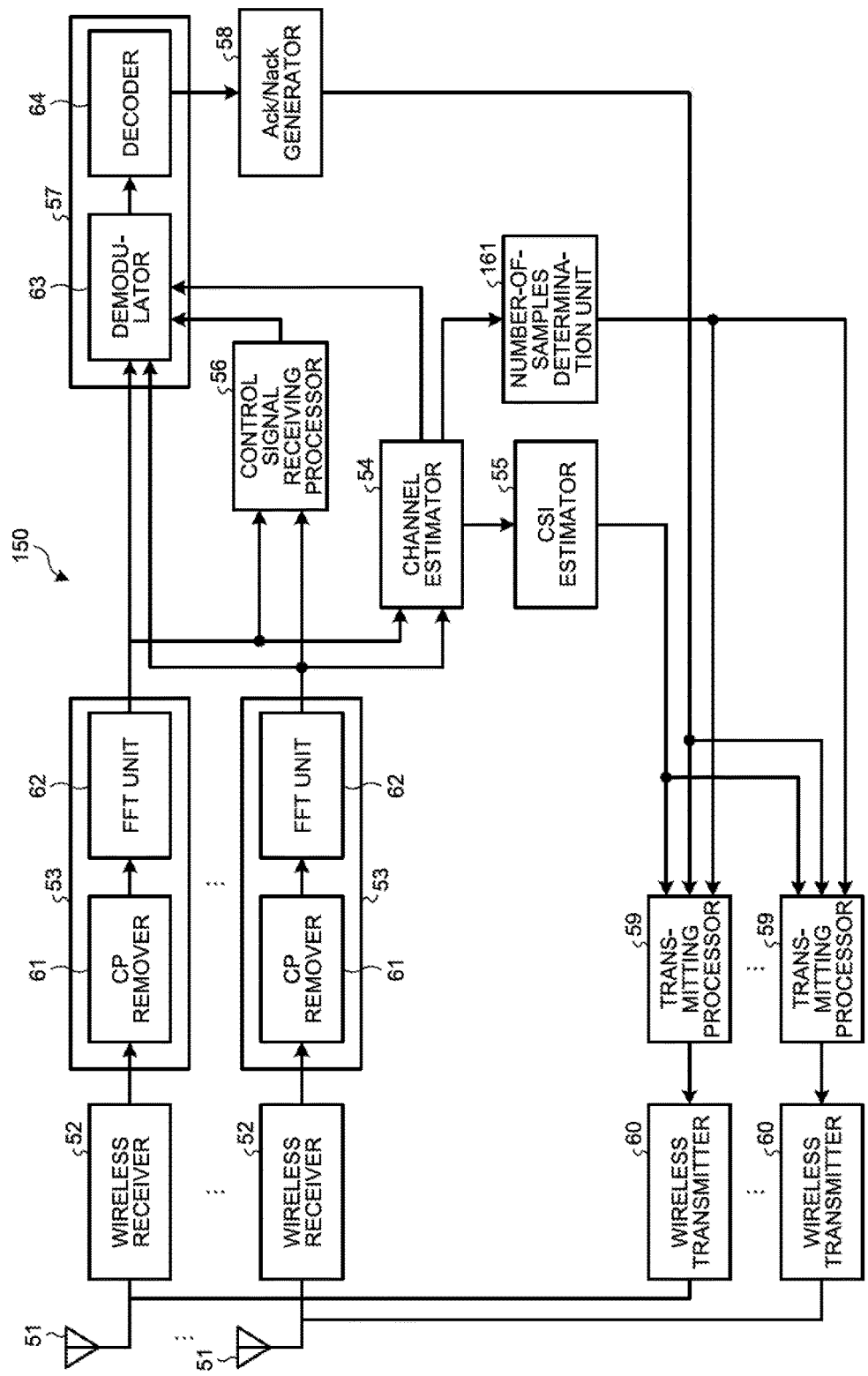
FIG. 19 is a block diagram of an exemplary terminal of the sixth embodiment.

FIG. 19 is a block diagram of an exemplary terminal of the sixth embodiment. As the components in FIG. 19 denoted with the same reference numerals as those in FIG. 5, excluding the aspect to be described below, have the same or similar functions as or to those illustrated in FIG. 5, descriptions thereof will be omitted. According to FIG. 19, the terminal 150 includes a number-of-samples determination unit 161.

On the basis of a channel matrix estimated by the channel estimator 54, the number-of-samples determination unit 161 determines the "number of samples" of a current channel matrix and a past channel matrix with respect to its corresponding terminal 50. For example, the number-of-samples determination unit 161 estimates a maximum doppler frequency with respect to the terminal 150 by using the channel matrix that is determined by the channel estimator 54. The number-of-samples determination unit 161 determines the "number of samples" on the basis of the maximum doppler frequency with respect to the terminal 150. The "number of samples" determined by the number-of-samples determination unit 161 is sent as a feedback to the base station 510 via each of the transmitting processor 59, the wireless transmitter 60 and the receiving antennas 51.

Exemplary Operations of Wireless Communication System

Figure 20:
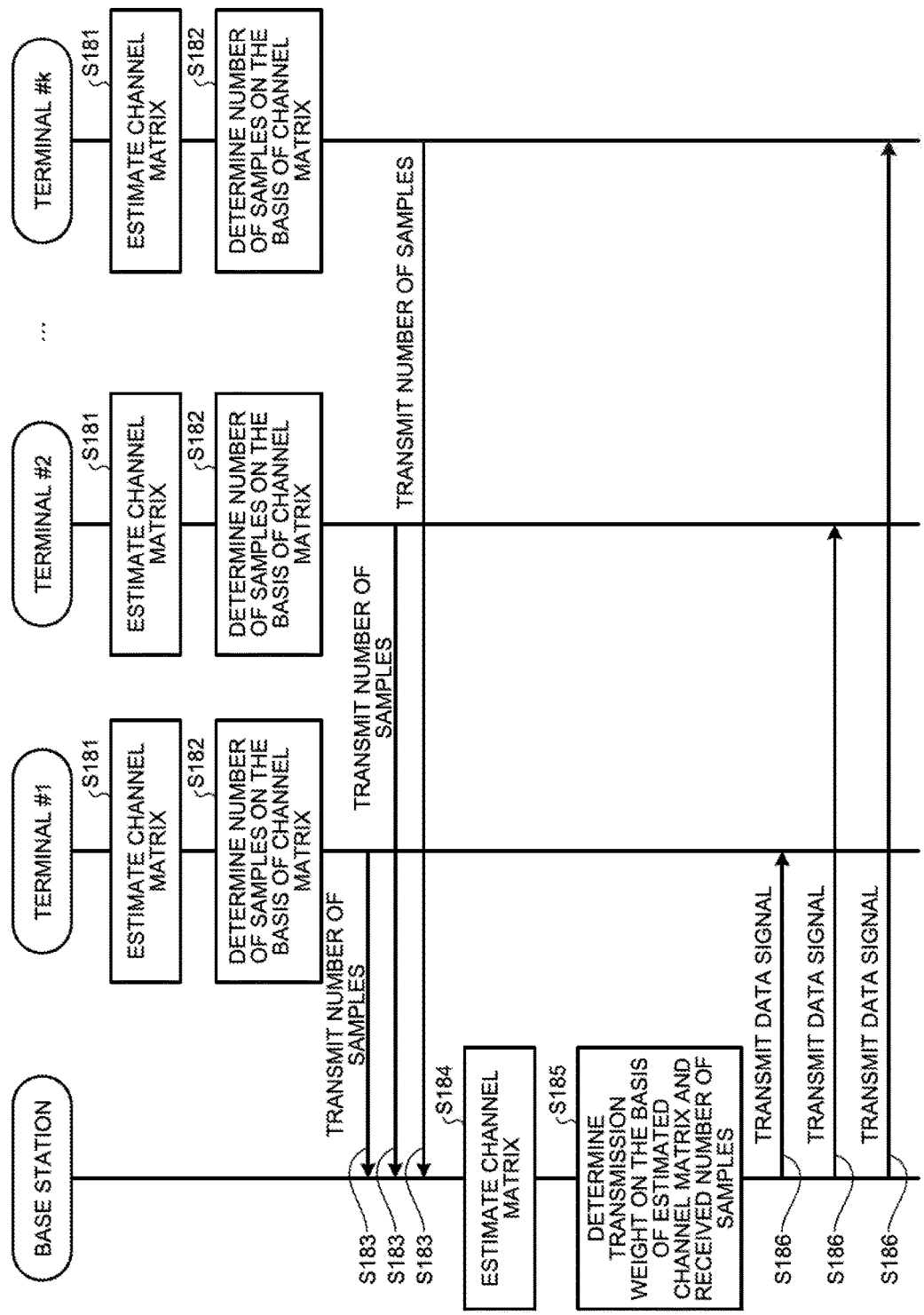
FIG. 20 is a sequence chart of exemplary processing operations of a wireless communication system of the sixth embodiment.

Exemplary processing operations of the wireless communication system including the base station 510 and the terminals 150 and having the above-described configuration will be described. FIG. 20 is a sequence chart of exemplary processing operations of the wireless communication system of the sixth embodiment. The "base station" in FIG. 20 corresponds to the base station 510 and each of the terminals #1 to #k corresponds to the terminal 150.

As illustrated in FIG. 20, each of the terminals 150 estimates a channel matrix with respect to the terminal 150 (step S181). Each of the terminals 150 determines the "number of samples" of a current channel matrix and a past channel matrix with respect to the terminal 150 on the basis of the estimated channel matrix (step S182). Each of the terminals 150 sends back the determined "number of samples" as a feedback to the base station 510 (step S183).

The base station 510 having received the "number of sample" that is sent as a feedback from each of the terminals 150 estimates a channel matrix with respect to each of the terminals 50 (step S184). On the basis of the estimated channel matrix and the received "number of samples", the base station 510 determines a transmission weight corresponding to each of the terminals 150 such that the transmission weight is orthogonal to current and past channel matrices with respect to the terminal 150 that is a subject of interference (step S185). The base station 510 multiplies data signals with the respective determined transmission weights and transmits the data signals multiplied with the respective transmission weights to the terminals 150, respectively (step S186).

According to the sixth embodiment, even when the terminal 150 determines the "number of samples" and sends the determined "number of samples" as a feedback to the base station 510, it is possible to properly change the number of users for multiplexing in MIMO communications that increases or decreases according to the "number of samples". Accordingly, it is possible to maintain the throughput while suppressing interference between users resulting from varying channels.

The case has been described where the number-of-samples determination unit 161 determines the "number of samples" by using the same method as that performed by the number-of-samples controller 23 of the first embodiment; however, the disclosed technology is not limited to this. For example, the number-of-samples determination unit 161 may determine the "number of samples" by using the same method as that performed by the number-of-samples controller 223 of the third embodiment or that performed by the number-of-samples controller 423 of the fifth embodiment. Alternatively, for example, the number-of-samples determination unit 161 may determine the "number of samples" and the "cycle" by using the same method as that performed by the number-of-samples/cycle controller 123 of the second embodiment and the number-of-samples/cycle controller 323 of the fourth embodiment.

[g] Other Embodiments

The elements of each of the components according to the first to sixth embodiments illustrated in the drawings are not necessarily configured physically as illustrated in the drawings. In other words, a specific mode of distribution and integration of the components are not limited to those illustrated in the drawings. All or part of the components may be distributed or integrated functionally or physically according to any unit and according to various types of load, the usage, etc.

All or any part of the various processing functions implemented by the respective devices may be implemented on a central processing unit (CPU) (or a microcomputer, such as a micro processing unit (MPU) or a micro controller unit (MCU)). All or any part of the various functions may be implemented on a program that is analyzed and executed by a CPU (or a microcomputer, such as a MPU or MCU) or a hard wired logic.

The base stations and the terminals according to the first to sixth embodiments may be implemented by using, for example, the following hardware configuration.

Figure 21:
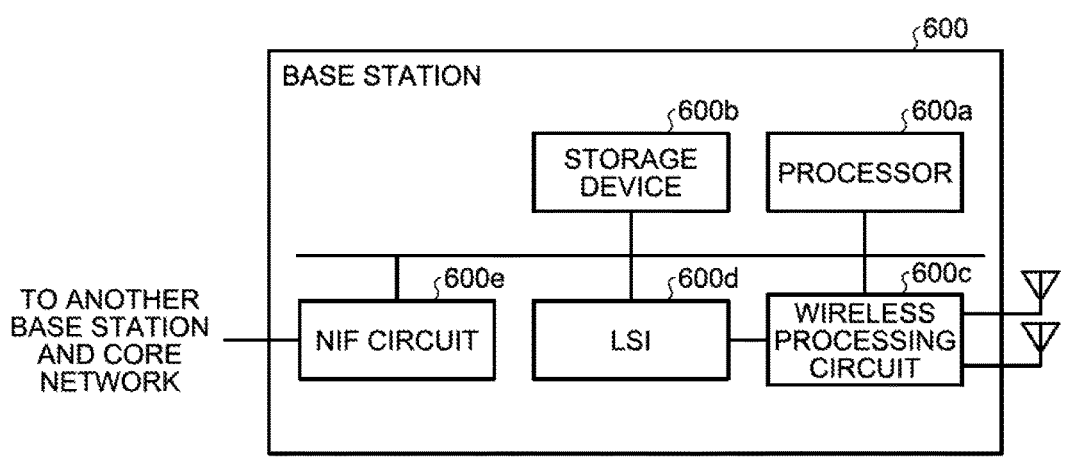
FIG. 21 is a block diagram of an exemplary hardware configuration (first configuration) of a base station.

FIG. 21 is a diagram of an exemplary hardware configuration (first configuration) of a base station. As illustrated in FIG. 21, a base station 600 includes a processor 600a, a storage device 600b, a wireless processing circuit 600c, a large scale integration (LSI) 600d, and a network interface (NIF) circuit 600e. There are a CPU, a digital signal processor (DSP), a field programmable gate array (FPGA), etc., as examples of the processor 600a. Furthermore, there are a random access memory (RAM), such as a synchronous dynamic random access memory (SDRAM), a read only memory (ROM), a flash memory, etc., as examples of the storage device 600b. Each of the base stations of the first to sixth embodiments has the configuration illustrated in FIG. 21.

The various processing functions implemented by the base stations of the first to sixth embodiments may be implemented by the processors of the base stations by executing programs that are stored in various memories, such as a non-volatile storage medium. In other words, programs corresponding to the processes executed by the data signal generator 12, the weight multiplier 13, the channel multiplexer 14, and the OFDM transmitting processor 15, respectively, may be recorded in the storage device 600b and each of the programs may be executed by the processor 600a. Programs corresponding to the processes executed by the channel estimator 18, the receiving processor 19, the scheduler 20, and the control signal generator 21, respectively, may be recorded in the storage device 600b and each of the programs may be executed by the processor 600a. Programs corresponding to the processes executed by the maximum doppler frequency estimator 22, the predictive model generator 221 or 321, the index value calculator 222 or 322, respectively, may be recorded in the storage device 600b and each of the programs may be executed by the processor 600a. Programs corresponding to the processes executed by the chronological channel matrix generator 421 and the decomposition unit 422, respectively, may be recorded in the storage device 600b and each of the programs may be executed by the processor 600a. Programs corresponding to the processes executed by the number-of-samples controller 23, 223 or 423 and the number-of-samples/cycle controller 123 or 323, respectively, may be stored in the storage device 600b and each of the programs may be executed by the processor 600a. Furthermore, the wireless transmitter 16 and the wireless receiver 17 may be implemented by, for example, the wireless processing circuit 600c.

Figure 22:
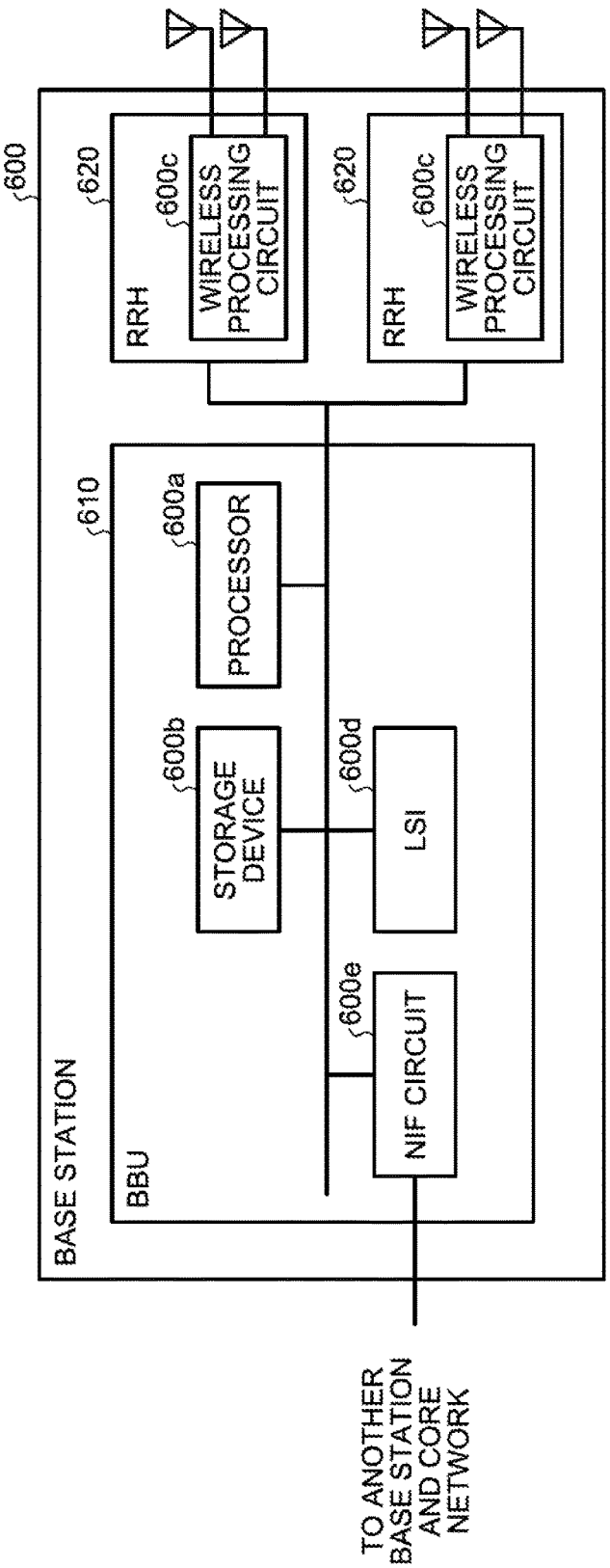
FIG. 22 is a block diagram of an exemplary hardware configuration (second configuration) of the base station.

The base station 600 has been described as a single device; however, the base station 600 is not limited to this. For example, as illustrated in FIG. 22, the base station 600 may be configured of a base band unit (BBU) 610 and a remote radio head (RRH) 620 that are different devices. FIG. 22 is a diagram of an exemplary hardware configuration (second configuration) of the base station. According to FIG. 22, for example, the wireless processing circuit 600c is provided in the RRH 620 and the processor 600a, the storage device 600b, the LSI 600d, and the NIF circuit 600e are provided in the BBU 610.

Figure 23:
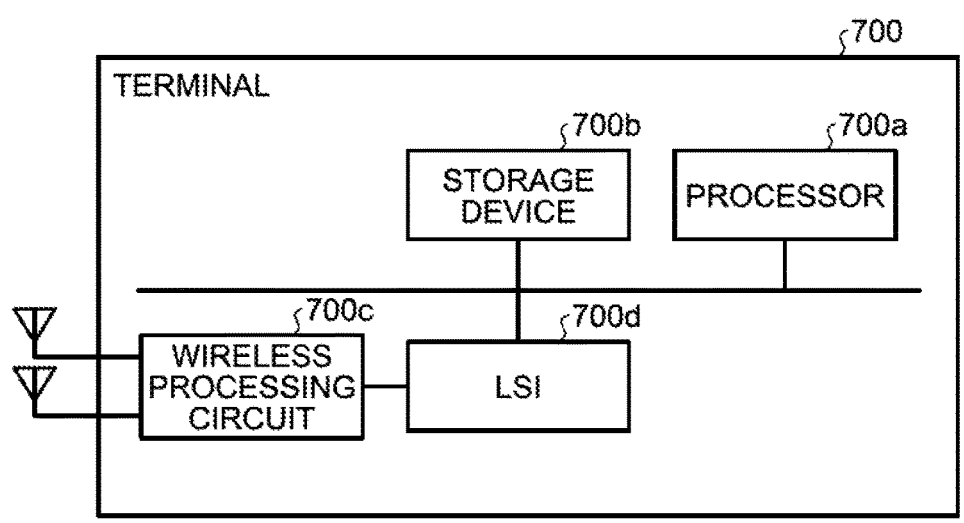
FIG. 23 is a block diagram of an exemplary hardware configuration of a terminal.

FIG. 23 is a diagram of an exemplary hardware configuration of a terminal. As illustrated in FIG. 23, a terminal 700 includes a processor 700a, a storage device 700b, a wireless processing circuit 700c, and a LSI 700d. Each of the terminals of the first to sixth embodiments has the configuration illustrated in FIG. 23.

There are, for example, a CPU, a DSP, or a FPGA as an example of the processor 700a. There are, for example, a RAM, such as a SDRAM, a ROM, or a flash memory as an example of the storage device 700b.

Various processing functions implemented by the terminals of the first to sixth embodiments may be implemented by a processor of an amplifier by executing the programs that are stored in various memories, such as a non-volatile storage medium. In other words, programs corresponding to the OFDM receiving processor 53, the channel estimator 54, the CSI estimator 55, and the control signal receiving processor 56 may be recorded in the storage device 700b and each of the programs may be executed by the processor 700a. Programs corresponding to the receiving processor 57, the Ack/Nack generator 58, the transmitting processors 59, and the number-of-samples determination unit 161 may be stored in the storage device 700b and each of the programs may be executed by the processor 700a. Furthermore, the wireless receiver 52 and the wireless transmitter 60 are implemented by, for example, the wireless processing circuit 700c.

According to the embodiment of the base station disclosed herein, there is an effect that it is possible to maintain the throughput while suppressing interference between users.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it is to be understood that the various changes, substitutions, and alterations could be made hereto without departing from the spirit and scope of the invention.

What is claimed is:

1. A base station comprising:
a processor configured to:
estimate a channel matrix with respect to each of a plurality of terminals;
determine a transmission weight corresponding to each of the plurality of terminals on the basis of the channel matrix that is estimated such that the transmission weight is orthogonal to a current channel matrix and one or more past channel matrices of a terminal that is a subject of interference; and
increase or decrease, before the transmission weight is determined, a total number of the current channel matrix and the one or more past channel matrices of the terminal that is the subject of interference to which the transmission weight is to be orthogonal.

2. The base station according to claim 1, wherein the processor is further configured to increase or decrease, before the transmission weight is determined, a cycle at which the channel matrix is estimated.

3. The base station according to claim 1, wherein the processor is further configured to:
estimate a maximum doppler frequency with respect to each of the plurality of terminals by using the channel matrix,
wherein the processor is further configured to increase or decrease the total number of on the basis of the maximum doppler frequency with respect to the terminal that is the subject of interference.

4. The base station according to claim 2, wherein the processor is further configured to:
estimate a maximum doppler frequency with respect to each of the plurality of terminals by using the channel matrix,
wherein the processor is further configured to increase or decrease the total number and the cycle on the basis of the maximum doppler frequency with respect to the terminal that is the subject of interference.

5. The base station according to claim 1, wherein the processor is further configured to:
use the channel matrix to generate a vector matrix by vectorizing the channel matrix with respect to the terminal that is the subject of interference and generate a predictive model of the vector matrix by using a linear combination of a past vector matrix; and
calculate an index value for evaluating the predictive model,
wherein the processor is further configured to increase or decrease the total number on the basis of the index value.

6. The base station according to claim 2, wherein the processor is further configured to:
use the channel matrix to generate a vector matrix by vectorizing the channel matrix with respect to the terminal that is the subject of interference and generate a predictive model of the vector matrix by using a linear combination of a past vector matrix; and
calculate an index value for evaluating the predictive model,
wherein the processor is further configured to increase or decrease the total number and the cycle on the basis of the index value.

7. The base station according to claim 1, wherein the processor is further configured to:
use the channel matrix to generate a vector matrix by vectorizing the channel matrix with respect to the terminal that is the subject of interference and generate a chronological channel matrix by combining the vector matrices chronologically; and
acquire singular values or eigenvalues by performing singular-value decomposition or eigenvalue decomposition on the chronological channel matrix,
wherein the processor is further configured to increase or decrease the total number on the basis of any one of the singular values or the eigenvalues.

8. The base station according to claim 1, wherein the processor is further configured to choose, among the plurality of terminals, a terminal as a scheduling target that satisfies a condition that is predetermined on the basis of a degree of freedom of a transmission antenna and exclude a terminal that does not satisfy the condition from the scheduling target.

9. A terminal that communicates with a base station, the terminal comprising:
a processor configured to:
estimate a channel matrix with respect to the terminal;
determine a total number of a current channel matrix and one or more past channel matrices with respect to the terminal on the basis of the channel matrix that is estimated; and
send the total number that is determined as a feedback to the base station,
wherein the base station estimates a channel matrix with respect to each of a plurality of terminals including the terminal and determines a transmission weight corresponding to each of the plurality of terminals on the basis of the estimated channel matrix and the total number that is sent as the feedback from the terminal such that the transmission weight is orthogonal to a current channel matrix and one or more past channel matrices with respect to a terminal that is a subject of interference.

10. A base station control method comprising:
estimating a channel matrix with respect to each of a plurality of terminals;
determining a transmission weight corresponding to each of the plurality of terminals on the basis of the estimated channel matrix such that the transmission weight is orthogonal to a current channel matrix and one or more past channel matrixes of a terminal that is a subject of interference; and
before the transmission weight is determined, increasing or decreasing a total number of the current channel matrix and the one or more past channel matrixes of the terminal that is the subject of interference to which the transmission weight is to be orthogonal.

* * * * *